(12) United States Patent
Suryanarayana et al.

(10) Patent No.: US 11,824,775 B2
(45) Date of Patent: *Nov. 21, 2023

(54) INTER-NETWORK SERVICE CHAINING

(71) Applicant: Juniper Networks, Inc., Sunnyvale, CA (US)

(72) Inventors: Anantharamu Suryanarayana, San Jose, CA (US); Manish Krishnan, Sunnyvale, CA (US); Jacopo Pianigiani, Cupertino, CA (US); Vivekananda Shenoy, Singapore (SG); Mahesh Sivakumar, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/216,308

(22) Filed: Mar. 29, 2021

(65) Prior Publication Data
US 2021/0243118 A1 Aug. 5, 2021

Related U.S. Application Data

(63) Continuation of application No. 16/428,442, filed on May 31, 2019, now Pat. No. 10,965,592.

(51) Int. Cl.
*H04L 12/46* (2006.01)
*H04L 45/64* (2022.01)
(Continued)

(52) U.S. Cl.
CPC .......... *H04L 45/64* (2013.01); *G06F 9/45541* (2013.01); *H04L 12/4633* (2013.01);
(Continued)

(58) Field of Classification Search
CPC ..... H04L 47/724; H04L 45/50; H04L 45/745; H04L 12/4633; H04L 12/4641;
(Continued)

(56) References Cited

U.S. PATENT DOCUMENTS 7,664,119 B2 2/2010 Adams et al.
9,634,936 B2 4/2017 Bansal et al.
(Continued)

FOREIGN PATENT DOCUMENTS

CN 105306333 A 2/2016
CN 107547335 A 1/2018
(Continued)

OTHER PUBLICATIONS

Response to Extended Search Report dated Oct. 10, 2019 from counterpart European Application No. 19181602.4, filed Jun. 2, 2021, 34 pp.
(Continued)

*Primary Examiner* — Wei Zhao
(74) *Attorney, Agent, or Firm* — Shumaker & Sieffert, P.A.

(57) ABSTRACT

Techniques are described in which a centralized controller constructs a service chain between a bare metal server (BMS) and a virtual execution element (e.g., virtual machine or container), or in some instances a remote BMS, across a plurality of networks. In some examples, the controller may construct a service chain between a BMS and a virtual execution element or remote BMS using Ethernet Virtual Private Network (EVPN)-Virtual Extensible Local Area Network (VXLAN) and Internet Protocol Virtual Private Networks (IP VPNs) such as BGP/Multiprotocol Label Switching (BGP/MPLS) IP VPNs.

21 Claims, 8 Drawing Sheets

(51) Int. Cl.
  *G06F 9/455* (2018.01)
  *H04L 45/00* (2022.01)
  *H04L 45/50* (2022.01)
  *H04L 45/745* (2022.01)
  *H04L 69/164* (2022.01)

(52) U.S. Cl.
  CPC .......... *H04L 12/4641* (2013.01); *H04L 45/34* (2013.01); *H04L 45/50* (2013.01); *H04L 45/745* (2013.01); *H04L 69/164* (2013.01)

(58) Field of Classification Search
  CPC ......... H04L 29/06; H04L 45/64; H04L 45/34; H04L 69/164; G06F 9/45541; G06F 9/4554
  See application file for complete search history.

(56) References Cited

U.S. PATENT DOCUMENTS

| | | | |
|---|---|---|---|
| 9,692,692 B1 * | 6/2017 | Vairavakkalai | ....... H04L 45/745 |
| 10,965,592 B2 | 3/2021 | Suryanarayana et al. | |
| 2012/0113866 A1 * | 5/2012 | Tenny | ................... H04W 24/10 |
| | | | 370/254 |
| 2013/0294318 A1 * | 11/2013 | Amerga | .............. H04W 72/005 |
| | | | 370/312 |
| 2015/0244617 A1 | 8/2015 | Nakil et al. | |
| 2017/0373973 A1 | 12/2017 | Bickhart et al. | |
| 2018/0316595 A1 * | 11/2018 | Jiang | ....................... H04L 45/54 |

FOREIGN PATENT DOCUMENTS

| | | |
|---|---|---|
| CN | 108092890 A | 5/2018 |
| CN | 109728984 A | 5/2019 |
| EP | 2963866 A2 | 1/2016 |
| WO | 2013184846 A1 | 12/2013 |
| WO | 2019001397 A1 | 1/2019 |

OTHER PUBLICATIONS

Rabadan et al., "IP Prefix Advertisement in EVPN; draft-ietf-bess-evpn-prefix-advertisement-11," BESS Workgroup, Internet Draft, IETF, May 18, 2018, 36 pp.

Zhuang et al., "BGP Extensions for Enhanced VPN Auto Discovery; draft-zhuang-bess-enhanced-vpn-auto-discovery-03," Internet-Draft, IETF, May 6, 2019, 15 pp.

Rejection Decision, and translation thereof, from counterpart Chinese Application No. 201910911308.4 dated Jul. 27, 2022, 9 pp.

Second Office Action and Search Report, and translation thereof, from counterpart Chinese Application No. 201910911308.4 dated Jan. 28, 2022, 13 pp.

"Category Archive for 'Service Chaining': OpenContrail is an open source network virtualization platform for the cloud" OpenContrail 2017, available at http://www.opencontrail.org/category/service-chaining/ last accessed Apr. 30, 2019, 4 pp.

Rosen, "BGP/MPLS IP Virtual Private Networks (VPNs)," Network Working Group, RFC 4364, Feb. 2006, 48pp.

Extended Search Report from counterpart European Application No. 19181602.4, dated Oct. 10, 2019, 8 pp.

Prosecution history from U.S. Appl. No. 16/428,442 dated Aug. 5, 2020 through Nov. 27, 2020, 30 pp.

Communication pursuant to Article 94(3) EPC from counterpart European Application No. 19181602.4 dated Jun. 21, 2023, 10 pp.

Notification of Reexamination, and translation thereof, from counterpart Chinese Application No. 201910911308.4 dated May 26, 2023, 18 pp.

Reexamination Decision, and translation thereof, from counterpart Chinese Application No. 201910911308.4 dated Aug. 24, 2023, 22 pp.

* cited by examiner

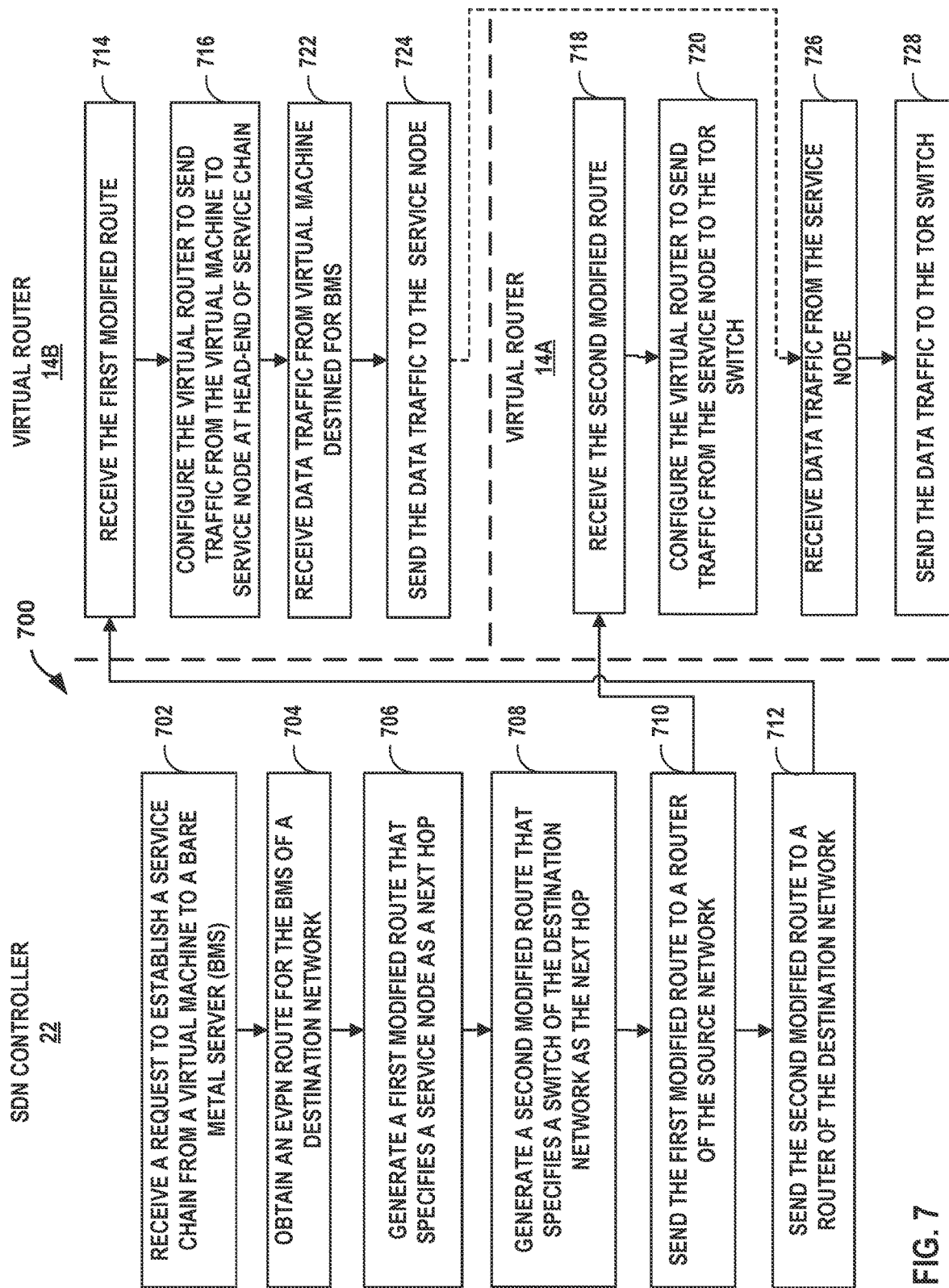

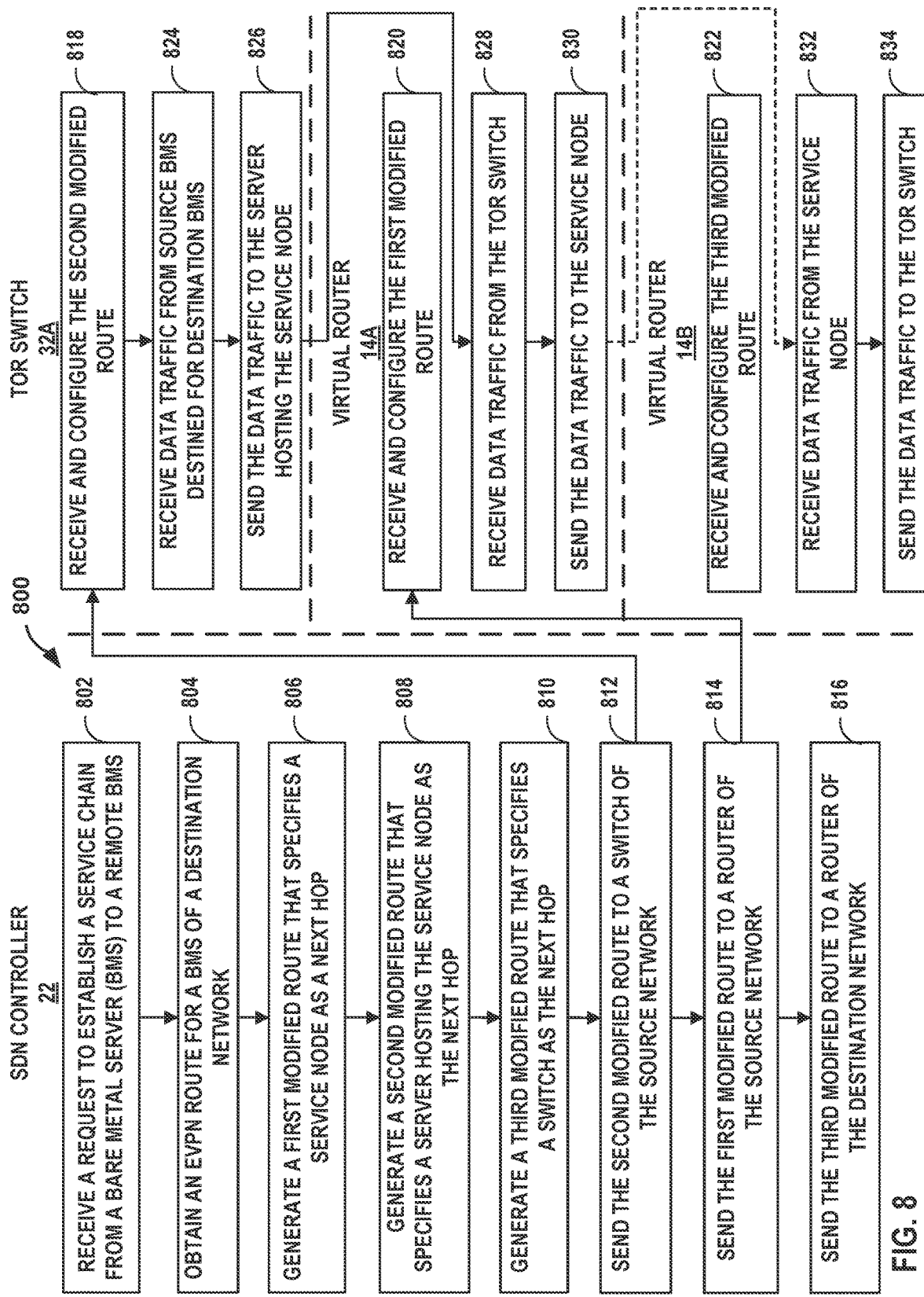

INTER-NETWORK SERVICE CHAINING

This application is a continuation of U.S. patent application Ser. No. 16/428,442, filed 31 May 2019, the entire contents of which is incorporated herein by reference.

TECHNICAL FIELD

This disclosure generally relates to computer networks and, more specifically, to applying network services to network traffic traversing computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

A network operator may deploy one or more network devices to implement service points that apply network services such as firewall, carrier grade network address translation (CG-NAT), performance enhancement proxies for video, transport control protocol (TCP) optimization and header enrichment, caching, and load balancing. In addition, the network operator may configure service chains that each identify a set of the network services to be applied to packet flows mapped to the respective service chains. A service chain, in other words, defines one or more network services to be applied in a particular order to provide a composite service for application to packet flows bound to the service chain.

SUMMARY

In general, techniques are described in which a centralized controller, such as a software defined networking (SDN) controller, constructs an inter-network service chain between a bare metal server (BMS) and a virtual execution element (e.g., virtual machine or container), or in some instances a remote BMS. In accordance with the techniques disclosed, the controller may construct an inter-network service chain to steer traffic between a BMS and a virtual execution element or remote BMS through an inter-network service chain using Ethernet Virtual Private Network (EVPN) as an underlying transport technology.

In one implementation, the controller may construct an inter-network service chain to steer traffic originating from a BMS through one or more service nodes, and ultimately to a virtual machine. For example, the controller may configure virtual private networks, such as Internet Protocol Virtual Private Networks (IP VPNs) such as BGP/Multiprotocol Label Switching (BGP/MPLS) IP VPNs, to establish a virtual network topology to direct traffic flows from a source VPN (referred to herein as "source network") to one or more service nodes that provides one or more network services to the traffic flows, and then to a destination VPN (referred to herein as "destination network"). To direct traffic from the source network to a destination network via the service nodes, the controller may obtain a route (referred to herein as "IP route") to the virtual machine associated with the destination network. The controller may modify the IP route to direct traffic from a source network to a service node rather than directly to the destination network. For example, the controller may modify the IP route by setting the next hop and, in some instances, a label or tunnel encapsulation information, or other next hop information that identifies a first service node at the head-end of a service chain of the one or more service nodes. The controller then advertises the modified IP route to the source network. This advertisement of the modified IP route by the controller and to the source network is referred to as a "re-originating" the IP route. A network device (e.g., virtual router) of the source network may import the modified IP route from the controller, which causes the network device to steer traffic to the route next hop, e.g., the service node at the head-end of the service chain.

As part of re-originating the IP route, the controller may also store the obtained IP route as an EVPN route. For example, the controller may, in addition to storing the IP route in an IP routing table for the source network, may also store the IP route as an EVPN route (e.g., EVPN Type-5 route that can specify the IP route for inter-subnet connectivity, i.e., connectivity of subdivisions of an IP network, across data centers) in an EVPN routing table for the source network. The controller may also set a next hop of the EVPN route to refer to a device (e.g., server) of the source network that hosts a network virtual function (e.g., virtual machine) that implements the service node at the head-end of the service chain. The controller may advertise the modified EVPN route to a physical Top-of-Rack (TOR) switch that is directly connected to the BMS. The TOR switch may import the EVPN route from the controller to configure the TOR switch to steer data traffic originated from the BMS to the route next hop, e.g., the server hosting the service node at the head-end of the service chain.

In this way, when the TOR switch receives data traffic originating from the BMS that is destined for the virtual machine of the destination network, the TOR switch may steer traffic using, for example, Virtual Extensible Local Area Network (VXLAN), to the server hosting the service node at the head-end of the service chain. When the server receives the data traffic, the server forwards the data traffic to the virtual router, which steers the data traffic to the next hop, e.g., service node at the head-end of the service chain. The virtual router of the source network steers the traffic to the service node using, for example, Multiprotocol Label Switching (MPLS) over Generic Route Encapsulation (GRE) or MPLS over User Datagram Protocol (UDP). The service node at the tail-end of the service chain in sends the data traffic to the virtual router of the destination network that ultimately sends the data traffic to the virtual machine.

In one implementation, the controller may construct an inter-network service chain to steer traffic originating from a virtual machine through one or more service nodes, and ultimately to a BMS. For example, the controller may obtain an EVPN route having an IP address of the BMS associated with the destination network. The controller may store the EVPN route as an IP route in an IP routing table for the source network and modify the IP route by setting a next hop to a service node at the head-end of the service chain of the one or more service nodes. The controller may advertise the modified IP route to the source network, wherein a virtual router of the source network may import the modified IP route from the controller so that the virtual router is configured to steer data traffic to the route next hop, e.g., the service node at the head-end of the service chain. The controller may also modify the IP route to set the next hop to a TOR switch directly connected to the BMS. The controller may advertise the modified IP route to the destination network to configure the virtual router of the destination network to steer data traffic received from a service node at the tail-end of the service chain to the next hop, e.g., the TOR switch.

In this way, a virtual machine of the source network that originates data traffic destined for the BMS may send the data traffic to the virtual router of the source network, which steers the data traffic using, for example, MPLSoGRE/UDP, to the service node at the head-end of the service chain. When the virtual router of the destination network receives the data traffic from the service node at the tail-end of the service chain, the virtual router of the destination network may send the data traffic using, for example, VXLAN to the TOR switch, which in turn sends the data traffic to the BMS.

In one implementation, the controller may construct an inter-network service chain to steer traffic originating from a source BMS through one or more service nodes, and ultimately to a destination BMS. For example, the controller may obtain an EVPN route having an IP address of the destination BMS associated with the destination network. The controller may modify the EVPN route by setting a next hop to a server hosting a service node at the head-end of the service chain of the one or more service nodes. The controller may advertise the modified EVPN route to a TOR switch directly connected to the source BMS to configure the TOR switch to steer data traffic received from the source BMS to the route next hop, e.g., the server hosting the service node at the head-end of the service chain.

The controller may also store the EVPN route as an IP route in an IP routing table of the source network and set the next hop of the IP route to the service node at the head-end of the service chain. The controller advertises the modified IP route to the source network to configure the virtual router of the source network to steer data traffic received from the TOR switch directly connected to the source BMS to the route next hop, e.g., the service node at the head-end of the service chain. The controller may also modify the IP route to set the next hop to a TOR switch directly connected to the destination BMS. The controller may advertise the modified IP route to the destination network to configure the virtual router of the destination network to steer data traffic received from a service node at the tail-end of the service chain to the next hop, e.g., the TOR switch.

In this way, when the TOR switch of the source network receives data traffic originating from the source BMS that is destined for the destination BMS, the TOR switch may steer the data traffic using, for example, VXLAN, to the server hosting the service node at the head-end of the service chain. When the server receives the data traffic, the server forwards the data traffic to the virtual router, which steers the data traffic to the next hop, e.g., service node at the head-end of the service chain. The virtual router of the source network steers the traffic to the service node using, for example, Multiprotocol Label Switching (MPLS) over Generic Route Encapsulation (GRE) or MPLS over User Datagram Protocol (UDP). The service node at the tail-end of the service chain in sends the data traffic to the virtual router of the destination network. When the virtual router of the destination network receives the data traffic from the service node at the tail-end of the service chain, the virtual router of the destination network may send the data traffic using, for example, VXLAN to the TOR switch, which in turn sends the data traffic to the BMS.

The techniques of this disclosure may provide for one or more technical advantages. For example, by also re-originating the routes of the destination network as EVPN routes that include a next hop set to the server that hosts a service node, a service chain connecting the source network and destination network via the service node is extended to a bare metal server. This enables traffic between the BMS and a virtual execution element, and in some instances a BMS, to be steered through one or more service nodes of a service chain using EVPN as the underlying transport technology, while maintaining the use of IP VPNs, which may provide scalability advantages.

In one example, a method includes obtaining, by a controller and from a destination network, a route that specifies a next hop to a destination address reachable by the destination network. The method also includes generating, by the controller, a first modified route that specifies a service node as the next hop for the destination address, wherein the service node is external to the destination network. The method further includes generating, by the controller, a second modified route that specifies a server hosting the service node as the next hop for the destination address. Moreover, the method includes sending, by the controller, the second modified route to a switch of a source network to configure the switch to send traffic originating from a bare metal server and destined for the source network to the server hosting the service node. The method also includes sending, by the controller, the first modified route to a router of the source network to configure the router to send the traffic received from the switch to the service node.

In another example, a method includes obtaining, by a controller and from a switch in a destination network, an Ethernet Virtual Private Network (EVPN) route that specifies a next hop to an Internet Protocol (IP) address of a bare metal server reachable by the destination network. The method also includes generating, by the controller, a first modified IP route that specifies a service node as a next hop for the destination address. The method further includes generating, by the controller, a second modified IP route that specifies the switch as the next hop for the destination address, wherein the switch is directly connected to the bare metal server. The method also includes sending, by the controller, the first modified IP route to a router of a source network to configure the router of the source network to send traffic originating from the virtual machine and destined for the bare metal server to the service node. Moreover, the method includes sending, by the controller, the second modified IP route to a router of the destination network to configure the router of the destination network to send the traffic received from the service node to the switch.

In yet another example, a controller includes one or more processors. The controller also includes a control unit executed by the one or more processors configured to obtain a route from a destination network that specifies a next hop to a destination address reachable by the destination network. The controller further includes a service chain unit executed by the one or more processors configured to generate a first modified route that specifies a service node as the next hop for the destination address, wherein the service node is external to the destination network. The one or more processors are further configured to generate a second modified route that specifies a server hosting the service node as the next hop for the destination address. The one or more processors are also configured to send the second modified route to a switch of a source network to configure the switch to send traffic from a bare metal server to the server hosting the service node, wherein the traffic is originated from the bare metal server and destined for the source network. The one or more processors are further configured to send the first modified route to a router of the source network to configure the router of the source network to send the traffic received from the switch to the service node.

The details of one or more techniques of the disclosure are set forth in the accompanying drawings and the description below. Other features, objects, and advantages of the invention will be apparent from the description and drawings, and from the claims.

BRIEF DESCRIPTION OF DRAWINGS

FIG. 7 is a flowchart illustrating an example operation of a network system providing an inter-network service chain from a virtual execution element to a bare metal server, in accordance with one or more aspects of the techniques described in this disclosure.

FIG. 8 is a flowchart illustrating an example operation of a network system providing an inter-network service chain from a bare metal server to a remote bare metal server, in accordance with one or more aspects of the techniques described in this disclosure.

Like reference characters denote like elements throughout the figures and text.

DETAILED DESCRIPTION

Figure 1:
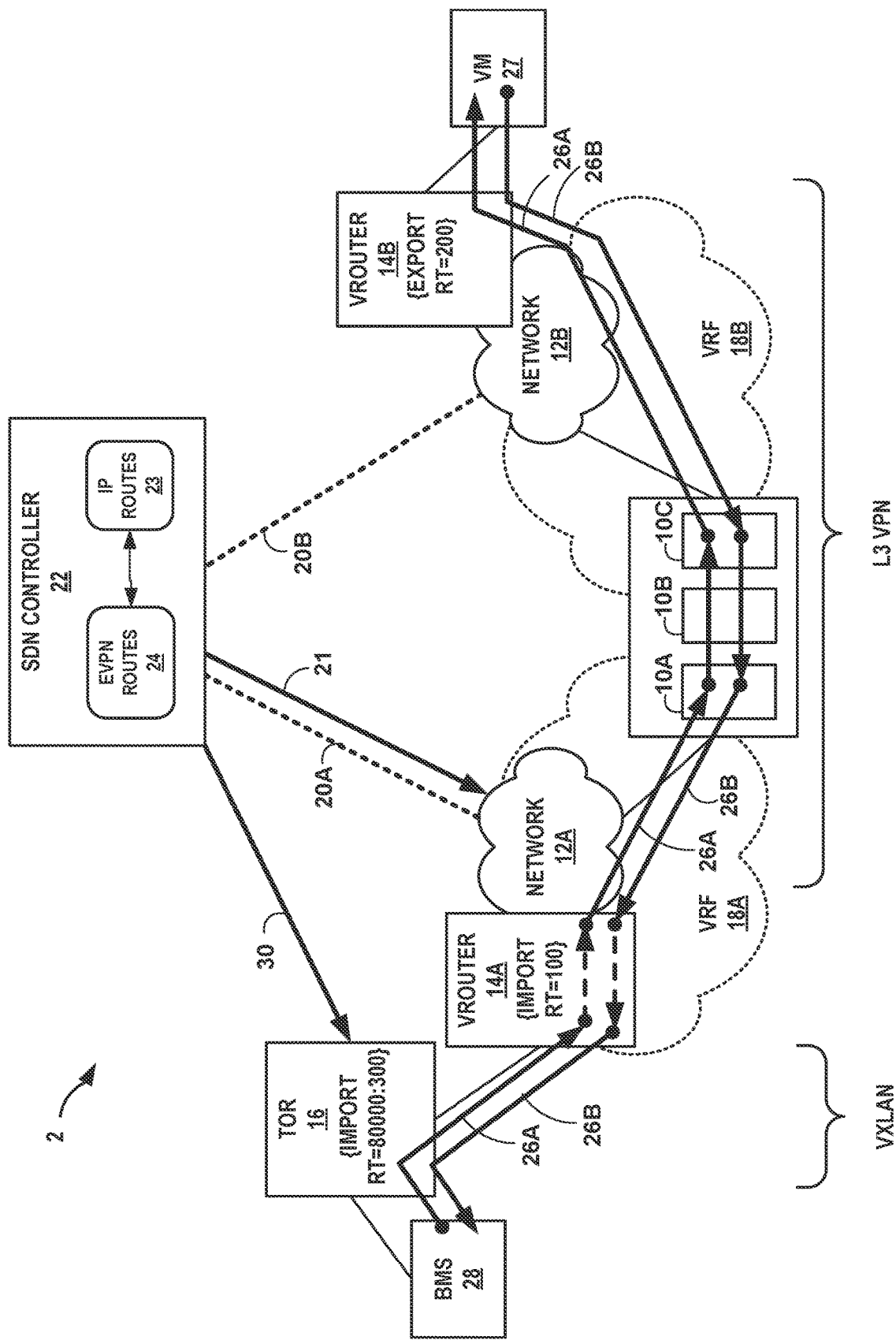
FIG. 1 is a block diagram illustrating an example network system in accordance with one or more aspects of the techniques described in this disclosure.

FIG. 1 is a block diagram illustrating an example network system 2 in accordance with techniques described in this disclosure. Network system 2 includes networks 12A-12B (collectively, "networks 12") having network devices, e.g., virtual routers 14A-14B (collectively, "virtual routers 14") to provide connectivity for networks 12.

In the example of FIG. 1, networks 12 may represent virtual networks established for network system 2. In some instances, networks 12 could be implemented as layer 3 virtual private networks (VPNs). These layer 3 VPNs may represent Internet Protocol VPNs (IP VPNs) such as BGP/Multiprotocol Label Switching (BGP/MPLS) IP VPNs. The implementation of IP VPNs provides scalability advantages.

For example, network system 2 implements IP VPNs to segregate traffic for different customers by ensuring that routes from different VPNs (e.g., networks 12) remain distinct and separate, regardless of whether VPNs for respective customers have overlapping address spaces. For each VPN configured for network system 2 and in which a particular virtual router 14 participates, the virtual router maintains a VPN Routing and Forwarding instance (VRF), e.g., VRFs 18A-18B (collectively, "VRFs 18"). SDN controller 22 may have a distinct routing table for the VRF by which the virtual router forwards network packets associated with the VRF. BGP/MPLS IP VPNs use BGP to distribute VPN routing information (e.g., IP routes) across an IP backbone, and MPLS is used to forward VPN traffic, such as using MPLSoUDP/GRE tunnels. Additional examples of BGP/MPLS IP VPNs are described in Rosen & Rekhter, "BGP/MPLS IP Virtual Private Networks (VPNs)," Internet Engineering Task Force Network Working Group, Request for Comments 4364, February, 2006, which is incorporated herein by reference in its entirety.

Virtual routers 14 may execute on one or more real servers (not shown) for networks 12, respectively. Each of virtual routers 14 may represent provider edge routers for networks 12, respectively. Servers that execute virtual routers 14 may provide an operating environment for execution of one or more customer-specific virtual machines (VMs). For example, the server that executes virtual router 14B may provide an operating environment for execution of VM 27 that may run customer applications such as Web servers, database servers, and/or enterprise applications for customers (not shown). VM 27 may be referred to as a virtualized application workload (or just application workload) and generally represents a virtualized execution element, such as a virtual machine or a container. Customer devices (not shown) may access data centers hosting virtual machines to provide customers with applications or services.

Virtual routers 14 may extend a network from physical routers and switches in a data center switch fabric into a virtual overlay network (e.g., tunnels) hosted in virtualized servers. Virtual routers 14 dynamically create and manage one or more virtual networks, e.g., networks 12, usable for communication between application workloads. In one example, virtual routers 14 execute the virtual network as an overlay network, which provides the capability to decouple an application's virtual address from a physical address (e.g., IP address) of a server on which the application is executing. In some examples, these overlay tunnels can be Multiprotocol Label Switching over Generic Routing Encapsulation/User Datagram Protocol (MPLS over GRE/UDP) tunnels, which can be used to tunnel traffic to a specific IP address of a virtual machine. In other examples, these overlay tunnels can be Virtual Extensible Local Area Network (VXLAN) tunnels that is used to tunnel traffic to a specific IP address of a physical device, such as a router or switch. Overlay tunnels may also include Network Virtualization using Generic Routing Encapsulation (NVGRE) tunnels, for instance.

Each virtual network 12 may use its own addressing and security scheme and may be viewed as orthogonal from the physical network and its addressing scheme. Virtual routers 14 contain per-tenant state. For example, virtual routers 14 may contain a separate forwarding table (a routing instance) per virtual network. That forwarding table contains IP prefixes (in the case of layer 3 overlays) or the MAC addresses (in the case of layer 2 overlays) of the virtual machines or other virtual execution elements (e.g., containers). A given virtual router may contain the routing instances that are locally present on the server, (that is, which have at least one virtual machine present on the server). As further described below, virtual router 14A may contain a routing instance for a virtual machine operating as service node 10, and virtual router 14B may contain a routing instance for VM 27. Alternatively, the underlying physical routers and switches might not contain any per-tenant state for virtual machines or other virtual execution elements, such as any MAC addresses, IP addresses or policies. For example, the forwarding tables of underlying physical routers and switches may contain the IP prefixes or MAC addresses of a physical server.

Network system 2 may include a bare metal server 28 ("BMS 28") that represents a server dedicated for use by a single customer (also referred to as "tenant" of a data center), which may be called a "single-tenant server." BMS 28 may provide dedicated hardware for use by the single customer to avoid so-called "noisy neighbor problems" that occur in multi-tenant servers. That is, unlike servers in which multiple customers may interact with the same physical hardware/server to interface with their individually allocated virtual router, BMS 28 is dedicated for use only by a single customer.

TOR switch 16 may be a physical network device that provides layer two (e.g., MAC) and/or layer 3 (e.g., IP) routing and/or switching functionality. TOR switch 16 may include one or more processors and a memory, and that are capable of executing one or more software processors. TOR switch 16 may be directly connected to BMS 28 by extending an attachment circuit to BMS 28 to provide BMS 28 with intra- or inter-network connectivity to virtual machines. In some instances, TOR switch 16 may implement EVPN-VXLAN to provide connectivity for BMS 28 and a physical device (e.g., server) hosting a virtual machine. EVPN-VXLAN may provide an EVPN used to extend two layer 2 customer networks through an intermediate layer 3 network to connect between BMS 28 and the virtual machine. VXLAN is used (e.g., in a data plane for instance) to provide an overlay network to communicate with TOR switch 16. TOR switch 16 may operate as a Virtual Tunnel endpoint (VTEP) for BMS 28. TOR switch 16 may use VXLAN to encapsulate traffic from BMS 28 to forward the traffic. That is, traffic from BMS 28 uses EVPN as the control-plane with VXLAN being used as the encapsulation in the underlying data plane.

Network system 2 may include one or more service nodes, e.g., service nodes 10A-10C (collectively, "service nodes 10"). Service nodes 10 may, for instance, apply one or more services to data traffic. As examples, service nodes 10 may apply one or more services such as a firewall, Deep Packet Inspection (DPI), Intrusion Detection System (IDS), Intrusion Preventions System (IPS), carrier grade network address translation (CG-NAT), media optimization (voice/video), IPSec/VPN services, transport control protocol (TCP) optimization and header enrichment, caching, HTTP filtering, counting, accounting, charging, and load balancing of packet flows or other types of services applied to network traffic. For ease of illustration, the examples described herein are described with respect to service nodes 10A-10C, but the techniques disclosed may provide service chaining for any number of service nodes.

In some examples, service nodes 10 may be executed within a virtual environment. In these examples, service nodes 10 may each represent a virtual node, e.g., virtual machine, in a virtual compute environment of a server that applies a service to data traffic received by the service nodes 10. Service nodes 10 may in some examples alternatively be referred to as "service points," "value-added service (VAS) points" or nodes, or "network function virtualization (NFV) nodes." Network function virtualization involves orchestration and management of networking functions such as a Firewalls, IDS/IPS, DPI, caching, Wide Area Network (WAN) optimization, etc. in virtual machines instead of on physical hardware appliances. In this way, service nodes 10 may each represent a service instance. As further described below, service nodes 10 may each represent a virtual machine orchestrated by the SDN controller 22 that implements one or more service chains, e.g., service chain 26A, by sequentially directing packets to service nodes 10 according to a particular service path. Service nodes 10 may each be associated with an IP address by which the service node is addressable to direct network traffic. The IP reachability to service nodes 10 may be advertised using BGP, for example.

SDN controller 22 provides a controller for configuring and managing routing and switching infrastructure of network system 2. SDN controller 22 provides a logically and in some cases physically centralized controller for facilitating operation of one or more virtual networks. SDN controller 22 may represent one or more server appliances, dedicated controller devices, or any combination of the above that executes processes to manage VPNs of network system 2. Additional information regarding an SDN controller 22 operating as a virtual network controller in conjunction with other devices (such as service nodes 10) or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In the example of FIG. 1, network system 2 may extend a cluster to include BMSes and other virtual instances connected to a TOR switch, e.g., TOR switch 16. For example, SDN controller 22 may configure a TOR switch using, for example, the Open vSwitch Database Management Protocol (OVSDB), to configure TOR switch 16. SDN controller 22 may use OVSDB to configure TOR switch 16 to be part of any of the virtual networks configured in the cluster. This enables a BMS, e.g., BMS 28, to communicate with any of the virtual instances in the cluster. SDN controller 22 may also use OVSDB to import dynamically learned addresses from a TOR switch. SDN controller 22 may further use policy configurations to control the communication of the BMSes and the virtual instances in the cluster.

In accordance with one or more aspects of the techniques described herein, SDN controller 22 may construct one or more inter-network service chains between BMS 28 and VM 27 via one or more of service nodes 10. In one implementation, SDN controller 22 may construct service chain 26A that steers traffic originating from BMS 28 associated with a source network 12A to one or more service nodes 10, and thereafter to virtual machine 27 associated with destination network 12B.

In the illustrated example of FIG. 1, SDN controller 22 may create tunnels across the underlay network that spans through all services in service chain 26A. For example, SDN controller 22 may provision respective routing instances that include virtual interfaces for service nodes 10 and routing instances of virtual routers 14 in order to steer traffic along service chain 26A from BMS 28 to service node 10, which in turn sends the traffic to VM 27. For example, SDN controller 22 may provision a "left" interface of a service node at the head-end of the service chain (e.g., service node 10A) that is associated with source network 12A such that data traffic entering the service nodes is forwarded to the "left" interface to access service node 10A. SDN controller 22 may also provision a "right" interface of a service node at the tail-end of the service chain (e.g., service node 10C) that is associated with destination network 12B such that data traffic exiting the service nodes is forwarded to the "right" interface to access the destination network 12B. In the example of FIG. 1, SDN controller 22 may further provision a "right" virtual network function (e.g., virtual machine 27) to be associated with destination network 12B.

Each of the intermediate service nodes (e.g., service node 10B) may be configured to receive data traffic from a preceding service node, e.g., service node 10A, and to forward data traffic to a subsequent service node, e.g., service node 10C. The service node at the tail-end of the service chain, e.g., service node 10C, is configured to send traffic to the "right" interface of service node 10C to direct data traffic to the destination network 12B.

To cause virtual router 14A of source network 12A to steer traffic flows along service chain 26A, SDN controller 22 may obtain from the destination network 12B an IP route of virtual router 14B with a next hop to VM 27, set the next hop of the IP route to refer to service node 10A, add the IP route to an IP routing table for the source network 12A, and advertise the modified IP route to the source network 12A. More specifically, SDN controller 22 may configure next hop and/or labels of the IP route to cause virtual router 14A to steer traffic to the "left" interface of service node 10A. This advertisement of the modified IP route by the SDN controller 22 and to the source network 12A is referred to as a "re-originating" the IP route.

In the illustrated example of FIG. 1, SDN controller 22 establishes communication sessions 20A-20B (collectively "communication sessions 20") with devices (e.g., virtual routers 14) of network system 2 to exchange control state information. Although described as a "session," communication session may not necessarily be stateful. In the example of FIG. 1, communication sessions 20A-20B may each represent an Extensible Messaging and Presence Protocol (XMPP) session or a session for another communication protocol suitable for exchanging control state. In some examples, the devices may represent physical devices. In these examples, the communication sessions may represent a Border Gateway Protocol (BGP) session. SDN controller 22 exchanges IP routes via communication session 20A with virtual router 14A of network 12A, and exchanges IP routes via communication session 20B with virtual router 14B of network 12B.

Virtual router 14B may provide IP routes reachable by network 12B including an IP route to a destination endpoint, e.g., VM 27. For example, virtual router 14B may provide an IP route that includes a destination IP address of VM 27 and a network address for a physical server that hosts VM 27. SDN controller 22 may obtain the IP route for network 12B via communication session 20B. In one implementation, SDN controller 22 may obtain the IP route from a virtual network (VN) agent of the server hosting virtual router 14B via communication session 20B.

SDN controller 22 modifies the obtained IP route to direct traffic to one or more of service nodes 10 rather than directly to destination network 12B. For example, to direct traffic destined for VM 27 from a source network 12A to service nodes 10 for processing, SDN controller 22 modifies the next hop in the obtained IP route to refer to the "left" interface of service node 10A. In some examples, modifying the next hop in the route may include modifying a destination network address for an underlying physical network to point to a network address of a server that executes service node 10A. In some examples, modifying the next hop in the route may also, or alternatively, include modifying a label (e.g., MPLS label) or other virtual network identifier, tunnel encapsulation information, or other next hop information that identifies service node 10A to a combination of network 12A and (in some cases) an underlying physical network. As a result, in instances in which service node 10A is applied by a virtual machine executing on a server that has one or more routing instances, the virtual router for the service may direct service chain 26A traffic that includes the MPLS label to service node 10A, which is associated in the virtual router with the routing instance.

SDN controller 22 may store the modified IP route in an IP routing table 23 for a routing instance for destination network 12B. The IP routing table may store IP addresses (e.g., IPv4 and/or IPv6 addresses) for dynamically learned routes, such as an IP address for VM 27 associated with destination network 12B. In some examples, the IP routing table 23 may include a BGP routing table that stores layer 3 VPN routes learned via BGP.

SDN controller 22 then advertises the modified IP route in a routing protocol message 21 to source network 12A, the modified IP route as described above having a next hop set to the "left" interface of service node 10A. In some examples, the routing protocol message 21 forwarded using XMPP. In some examples, the route in routing protocol message 21 may include a label that identifies service node 10A executed as a virtual machine by a server that has an interface addressable by the next hop specified by the route. The label may be a label that identifies a VRF implemented by the server for service node 10A. This VRF may be alternatively referred to as a "service VRF" or "service routing instance" and may be particular to the service node 10A, e.g., established by SDN controller 22 or another entity for the purpose of directing traffic to service node 10A.

In some examples, SDN controller may also mark the routing protocol message 21 with an appropriate route target (e.g., route target of 100 in this example) to cause virtual router 14A (and other routers of network 12A configured with an import route target 100) to import the modified IP route with the destination address of VM 27 and the next hop set to the "left" interface of service node 10A.

Virtual router 14A of source network 12A imports the modified IP route that was advertised in routing protocol message 21, which causes the virtual router 14A to steer data traffic from source network 12A to service node 10A rather than directly to destination network 12B. For example, when virtual router 14A receives network traffic destined for VM 27, virtual router 14A may steer the network traffic to the route next hop, i.e., service node 10A.

After applying one or more services to the traffic flow, the service node at the tail-end of the service chain, e.g., service node 10C, may send the traffic to the "right" interface of service node 10C toward destination network 12B. For example, the "right" interface of service node 10C sends the data traffic to virtual router 14B of destination network 12B, which in turn forwards the traffic to VM 27. Additional examples of a service chain between virtual entities of different networks is further described in U.S. Pat. No. 9,634,936, entitled "SERVICE CHAINING ACROSS MULTIPLE NETWORKS," filed Jun. 30, 2014, the entire contents of which is incorporated by reference herein.

In accordance with one or more aspects of the techniques disclosed herein, SDN controller 22 may also re-originate the IP routes as EVPN routes to extend the service chain 26A to BMS 28. For example, SDN controller 22, in addition to re-originating the IP route obtained from a destination network 12B into a source network 12A with a modified next hop to service node 10A, may re-originate the IP route as EVPN route with a next hop referring to a server that hosts the "left" interface of service node 10A.

For instance, in addition to storing the IP route in the IP routing table 23 for the routing instance for destination network 12B, SDN controller 22 may also store the IP route as an EVPN route in an EVPN routing table 24 for the routing instance. The EVPN routing table 24 may store EVPN related routes, such as EVPN Type-5 routes that specify IP prefixes (e.g., IP address for VM 27) for inter-subnet connectivity across data centers. Additional examples of EVPN Type-5 routes are described in "IP Prefix Advertisement in EVPN," BESS Workgroup, Internet Draft, draft-ietf-bess-evpn-prefix-advertisement-11, May 18, 2018, the entire contents of which is incorporated by reference herein.

SDN controller 22 may also modify the EVPN route by setting the next hop to refer to a server hosting the "left" interface of service node 10A. Modifying the next hop in the route may include modifying a destination network address for an underlying physical network to point to a network address of the server that executes the virtual machine that operates as the service node 10A.

To import the EVPN route, TOR switch 16 is configured with the appropriate route target. For example, TOR switch 16 may auto-generate a route target (e.g., 80000*). In the illustrated example, TOR switch 16 may generate an import route target 80000:300.

In some examples, SDN controller 22 may alternatively, or additionally, provision one or more logical routers for which to apply the service chain 26A. A logical router is a physical router that is partitioned into multiple logical devices the perform independent routing tasks. When creating the logical router, an SDN controller may also create an Internal Virtual Network that is used to carry EVPN-Type 5 routes. In these examples, the route target is configured for the associated Internal Virtual Network.

SDN controller 22 may send the EVPN route to TOR switch 16 with a next hop set to the server hosting the "left" interface of service node 10A and a route target of 80000: 300. In one example, SDN controller 22 may send a routing protocol advertisement 30 (e.g., BGP message) that includes the EVPN route, the next hop, and the route target. TOR switch 16 may import the EVPN route with the destination address of VM 27 and the next hop set to the server that hosts the "left" interface of service node 10A. TOR switch 16 may store the EVPN route in an EVPN routing table and configure a next hop in its forwarding table to the server that hosts the "left" interface of service node 10A.

When TOR switch 16 receives data traffic originating from BMS 28 and destined for VM 27, TOR switch 16 may perform a lookup of its forwarding table to determine the next hop, which is the server hosting the "left" interface of service node 10A. TOR switch 16 may encapsulate a VXLAN outer packet to the data traffic to tunnel the data traffic to a network address of the physical server hosting the "left" interface of service node 10A. TOR switch 16 may also encapsulate a virtual network identifier (VNI) (e.g., VXLAN tag) that identifies a routing instance for the destination network 12B.

When virtual router 14A of the server receives the VXLAN encapsulated data traffic, virtual router 14A de-encapsulates VXLAN outer header and performs a lookup of the next hop based on the VNI. The virtual router 14A may determine from the lookup that the next hop is the "left" interface of service node 10A. Virtual router 14A sends the packet to service node 10A using MPLSoGRE/UDP, for example. From here, service node 10A (and subsequent service nodes 10) applies one or more services to the data traffic. When the service node at the tail-end of the service chain, e.g., service node 10C, receives the data traffic, service node 10C steers the data traffic to virtual router 14B of destination network 12B, which in turn forwards the data traffic to VM 27.

In some examples, SDN controller 22 may compute a service chain 26B for traffic flowing in the opposite direction, i.e., from VM 27 to BMS 28. For example, SDN controller 22 may obtain an EVPN route having a destination address for BMS 28 associated with destination network 12A. For example, SDN controller 22 may obtain the EVPN route via communication session 20A with a TOR agent of TOR switch 16. The EVPN route may include an EVPN Type-5 route that specifies an IP address of BMS 28 associated with destination network 12A. SDN controller 22 may store the obtained EVPN route in an EVPN routing table 24 for source network 12B.

SDN controller 22 may re-originate the obtained EVPN route as an IP route. For example, in addition to storing the EVPN route in the EVPN routing table 24, SDN controller 22 may also store the EVPN route as an IP route in an IP routing table 23 for the routing instance. SDN controller 22 may set the next hop in the IP route to TOR switch 16. SDN controller 22 may advertise the IP route to the destination network, e.g., destination network 12A. The virtual router 14A may import the IP route and next hop referring to TOR switch 16 such that virtual router 14A is configured to steer data traffic received from a service node at the tail end of the service chain (e.g., service node 10A) to TOR switch 16.

SDN controller 22 may also advertise a routing protocol message including the EVPN route obtained from the destination network 12A to the source network 12B associated with the server hosting the service node at the head-end of the service chain, e.g., service node 10C. Virtual router 14B of the source network 12B may import the EVPN route in an EVPN routing table for the source network 12B and may also store the IP route specified in the EVPN route in an IP routing table.

When virtual router 14B receives data traffic originating from VM 27 and destined for BMS 28, virtual router 14B performs a lookup of its forwarding table and determines that the next hop is the head-end of the service chain (e.g., service node 10C in this example). Virtual router 14B may steer the traffic to service node 10C, using MPLSoGRE/UDP, for example. When the service node at the tail-end of the service chain, e.g., service node 10A, receives the data traffic, service node 10A steers the data traffic to virtual router 14A of destination network 12A. Virtual router 14A may receive the data traffic and perform a lookup of its forwarding table and determines that the next hop is TOR switch 16. Virtual router 14A may encapsulate a VXLAN outer packet to the data traffic to tunnel the data traffic to TOR switch 16. Virtual router 14A may encapsulate a VNI that identifies a routing instance for the destination network 12A. When TOR switch 16 receives the VXLAN encapsulated data traffic, TOR switch 16 de-encapsulates the VXLAN outer header and performs a lookup of the next hop based on the VNI. TOR switch 16 may determine from the lookup that the next hop is the BMS 28 and forwards the data traffic to BMS 28.

The techniques of this disclosure may provide for one or more technical advantages. For example, by also re-originating the routes of the destination network as EVPN routes that include a next hop set to the server that hosts a service node, a service chain connecting the source network and destination network via the service node is extended to a bare metal server. This enables traffic between the BMS and a virtual execution element, and in some instances a BMS, to be steered through one or more service nodes of a service chain using EVPN as the underlying transport technology, while maintaining the use of IP VPNs, which may provide scalability advantages.

Figure 2:
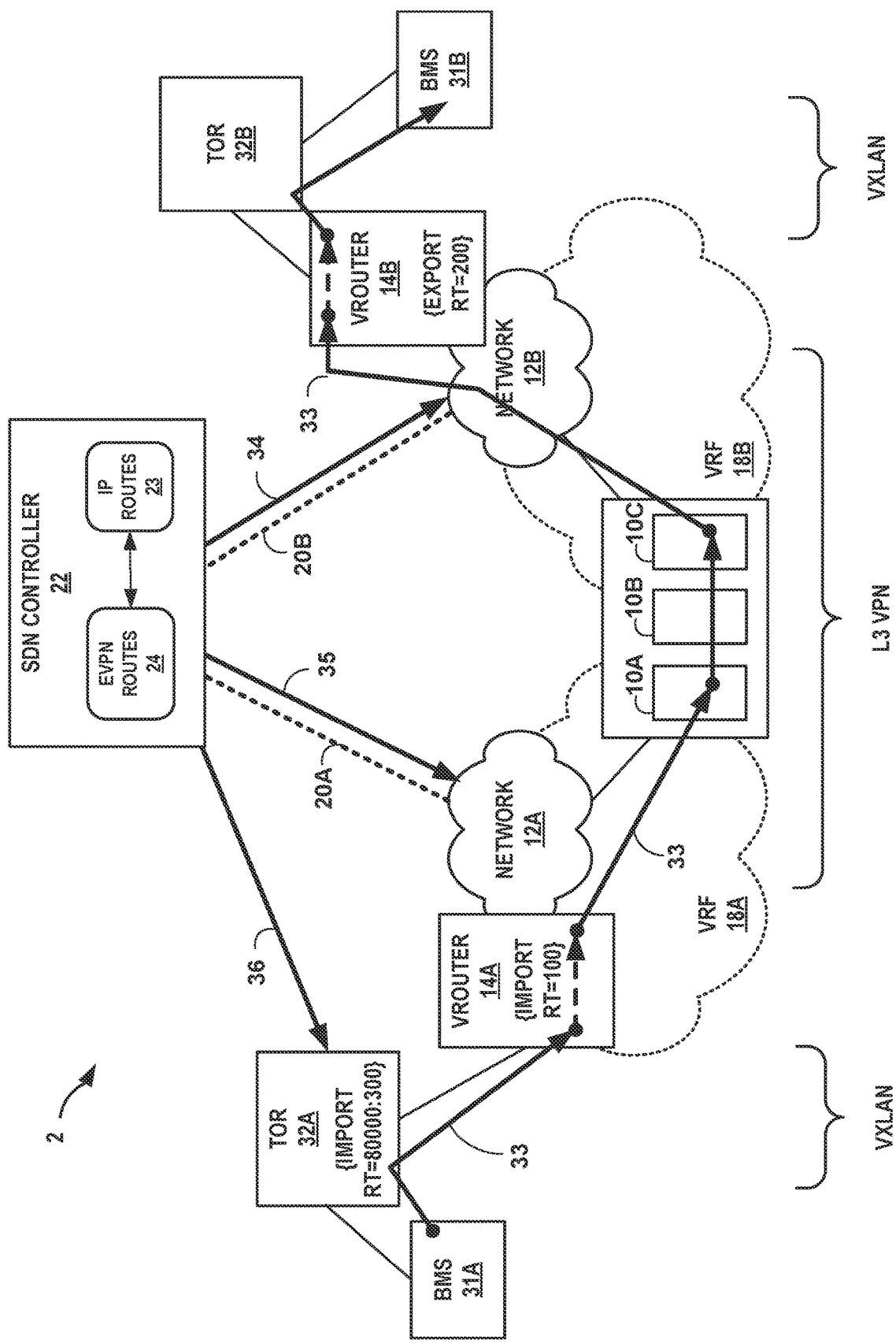
FIG. 2 is a block diagram illustrating another example network system in accordance with one or more aspects of the techniques described in this disclosure.

FIG. 2 is a block diagram illustrating another example of network system 2 in accordance with one or more aspects of the techniques described in this disclosure. In the example of FIG. 2, SDN controller 22 may construct an inter-network service chain between bare metal servers 31A-31B (collectively, "BMSes 31") via one or more service nodes, e.g., service nodes 10. In one implementation, SDN controller 22 may construct service chain 33 that steers traffic from a source BMS 31A associated with a source network 12A to one or more service nodes 10, and thereafter to destination BMS 31B associated with destination network 12B.

In this example, the SDN controller 22 may re-originate EVPN routes obtained from destination network 12B. For example, SDN controller 22 may obtain an EVPN route from communication session 20B with a TOR agent of TOR switch 32B. Communication session 20B may be a BGP session in this example. SDN controller 22 may obtain an EVPN route, such as an EVPN Type-5 route specifying an IP address of BMS 31B. SDN controller 22 may store the EVPN route in EVPN routing table 24 for the routing instance for destination network 12B.

SDN controller 22 may also set the next hop in the EVPN route to refer to a server hosting the service node at the head-end of the service chain 33 (e.g., service node 10A in this example). Modifying the next hop in the EVPN route may include modifying a destination network address for an underlying physical network to point to a network address of a server that hosts the "left" interface of service node 10A.

SDN controller 22 may advertise a routing protocol message 36 (e.g., BGP message) including the modified EVPN route, the next hop, and an appropriate route target to TOR switch 32A with a next hop referring to the server hosting the "left" interface of service node 10A. TOR switch 32A may import the EVPN route with the destination address of BMS 31B and the next hop set to the server that hosts the "left" interface of service node 10A. TOR switch 32A may store the EVPN route in an EVPN routing table and configure a next hop in its forwarding table to the server that hosts the "left" interface of service node 10A.

SDN controller 22 may re-originate the obtained EVPN route as an IP route and set the next hop of the IP route to refer to the TOR switch 32B for the routing instance for destination network 12B. For example, in addition to storing the EVPN route in the EVPN routing table 24, SDN controller 22 may also store the EVPN route as an IP route in an IP routing table 23 for the routing instance. SDN controller 22 may also set the next hop in a IP route to refer to TOR switch 32B. SDN controller 22 may advertise a routing protocol message 34 including the IP route to the destination network 12B to configure virtual router 14B to steer data traffic received from the tail end of the service chain, e.g., service node 10C, to TOR switch 32B.

SDN controller 22 may also advertise a routing protocol message 35 including the EVPN route obtained from the destination network 12B to the source network 12A associated with the server hosting the service node at the head-end of the service chain, e.g., service node 10A. Virtual router 14A of the source network 12A may import the EVPN route in an EVPN routing table for the source network 12A and may also store the IP route specified in the EVPN route in an IP routing table.

When TOR switch 32A receives data traffic originating from source BMS 31A and destined for destination BMS 31B, TOR switch 32A may perform a lookup of its forwarding table to determine the next hop, which is the server hosting the "left" interface of service node 10A. TOR switch 16 may encapsulate a VXLAN outer packet to the data traffic to tunnel the data traffic to a network address of the physical server hosting the "left" interface of service node 10A. TOR switch 16 may also encapsulate a VNI that identifies a routing instance for the destination network 12B.

When virtual router 14A of the server receives the VXLAN encapsulated data traffic, virtual router 14A de-encapsulates VXLAN outer header and performs a lookup of the next hop based on the VNI. The virtual router 14A may determine from the lookup that the next hop is the "left" interface of service node 10A. Virtual router 14A sends the packet to service node 10A using MPLSoGRE/UDP, for example. When the service node at the tail-end of the service chain, e.g., service node 10C, receives the data traffic, service node 10C steers the data traffic to virtual router 14B of destination network 12B. Virtual router 14B may receive the data traffic and perform a lookup of its forwarding table and determines that the next hop is TOR switch 32B. Virtual router 14B may encapsulate a VXLAN outer packet to the data traffic to tunnel the data traffic to TOR switch 32B. Virtual router 14B may encapsulate a VNI that identifies a routing instance for the destination network 12B. When TOR switch 32B receives the VXLAN encapsulated data traffic, TOR switch 32B de-encapsulates the VXLAN outer header and performs a lookup of the next hop based on the VNI. TOR switch 32B may determine from the lookup that the next hop is the destination BMS 31B and forwards the data traffic to BMS 31B.

Figure 3:
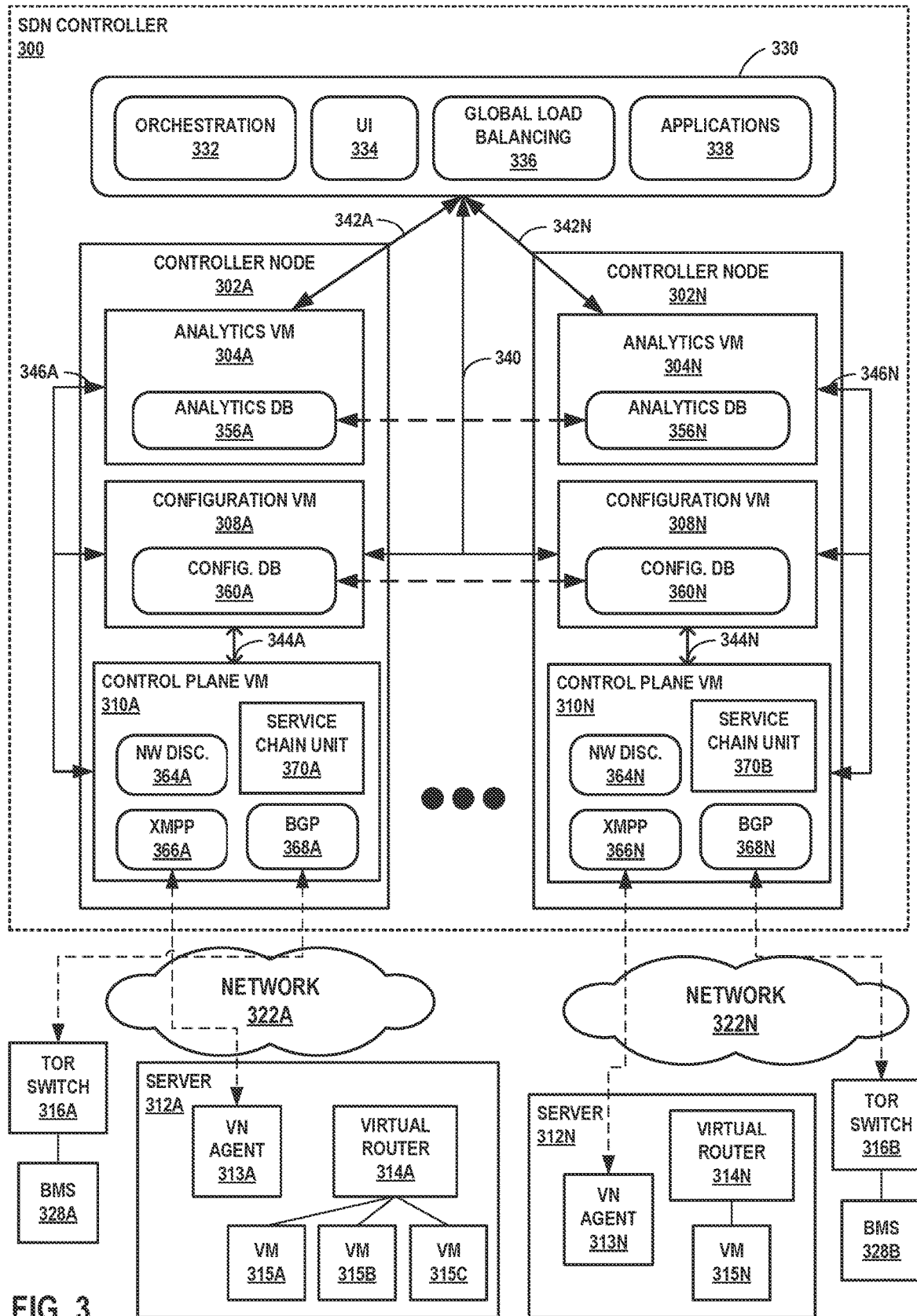
FIG. 3 illustrates an example controller operating in accordance with one or more aspects of the techniques described in this disclosure.

FIG. 3 illustrates an example controller operating in accordance with one or more aspects of the techniques described herein. SDN controller 300 may represent an example instance of SDN controller 22 of FIGS. 1-2. Although illustrated and described as a physically distributed and "virtual" network controller, some examples of SDN controller 300 may be both physically and logically centralized within an appliance or server.

As illustrated in the example of FIG. 3, SDN controller 300 includes one or more controller nodes 302A-302N (collectively, "controller nodes 302"). Each of controller nodes 302 may represent a distributed and "virtual" network controller of SDN controller 300. Controller nodes 302 that peer with one another according to a peering protocol operating over a network, which may represent an example instance of a switch fabric or L2/L3 IP fabric. In the illustrated example, controller nodes 302 peer with one another using a Border Gateway Protocol (BGP) implementation, an example of a peering protocol. In this sense, controller nodes 302A and 302N may represent a first controller node device and a second controller node device peered using a peering protocol. Controller nodes 302 include respective network discovery modules 364A-364N to discover network elements of the network.

Controller nodes 302 provide, to one another using the peering protocol, information related to respective elements of the virtual network managed, at least in part, by the controller nodes 302. For example, controller node 302A may manage a first set of one or more servers operating as virtual network switches for the virtual network. Controller node 302A may send information relating to the management or operation of the first set of servers to controller node 302N by BGP 368A. Other elements managed by controller nodes 302 may include network controllers and/or appliances, network infrastructure devices (e.g., L2 or L3 switches), communication links, firewalls, and controller nodes 302, for example. Because controller nodes 302 have a peer relationship, rather than a master-slave relationship, information may be sufficiently easily shared between the controller nodes 302. In addition, hardware and/or software of controller nodes 302 may be sufficiently easily replaced, providing satisfactory resource fungibility.

Each of controller nodes 302 may include substantially similar components for performing substantially similar functionality, said functionality being described hereinafter primarily with respect to controller node 302A. Controller node 302A may include an analytics database 356A for storing diagnostic information related to a first set of elements managed by controller node 302A. Controller node 302A may share at least some diagnostic information related to one or more of the first set of elements managed by controller node 302A and stored in analytics database 356, as well as to receive at least some diagnostic information related to any of the elements managed by others of controller nodes 302. Analytics database 356A may represent a distributed hash table (DHT), for instance, or any suitable data structure for storing diagnostic information for network elements in a distributed manner in cooperation with others of controller nodes 352.

Controller node 302A may include a configuration database 360A for storing configuration information related to a first set of elements managed by controller node 302A. Control plane components of controller node 302A may store configuration information to configuration database 360A using interface 340, which may represent an Interface for Metadata Access Points (IF-MAP) protocol implementation. Controller node 302A may share at least some configuration information related to one or more of the first set of elements managed by controller node 302A and stored in configuration database 360A, as well as to receive at least some configuration information related to any of the elements managed by others of controller nodes 302. Configuration database 360A may represent a distributed hash table (DHT), for instance, or any suitable data structure for storing configuration information for network elements in a distributed manner in cooperation with others of controller nodes 302. Portions of RIBs (including the IP routing table and EVPN routing table as described in FIG. 1) may be stored by control nodes to facilitate operation of network discovery modules and BGPs 368.

SDN controller 300 may perform any one or more of the illustrated SDN controller operations represented by modules 330, which may include orchestration 332, user interface 334, global load balancing 336, and one or more applications 338. SDN controller 300 executes orchestration module 332 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. SDN controller global load balancing 336 executed by SDN controller 300 supports load balancing of analytics, configuration, communication tasks, e.g., among controller nodes 302. Applications 338 may represent one or more network applications executed by controller nodes 302 to, e.g., change topology of physical and/or virtual networks, add services, or affect packet forwarding.

User interface 334 includes an interface usable to an administrator (or software agent) to control the operation of controller nodes 302. For instance, user interface 334 may include methods by which an administrator may modify, e.g. configuration database 360A of controller node 302A. Administration of the one or more virtual networks operated by SDN controller 300 may proceed by uniform user interface 334 that provides a single point of administration, which may reduce an administration cost of the one or more virtual networks.

Controller node 302A may include a control unit such as a control plane virtual machine (VM) 310A that executes control plane protocols to control and monitor a set of network elements. Control plane VM 310A may in some instances represent a native process. In the illustrated example, control plane VM 310A executes BGP 368A to provide information related to the first set of elements managed by controller node 302A to, e.g., control plane virtual machine 362N of controller node 302N. Control plane VM 310A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 310A-310N) may execute different software versions. In one or more aspects, e.g., control plane VM 310A may include a type of software of a particular version, and the control plane VM 310N may include a different version of the same type of software. The peering configuration of the control node devices may enable use of different software versions for the control plane VMs 310A-310N. The execution of multiple control plane VMs by respective controller nodes 302 may prevent the emergence of a single point of failure.

Control plane VM 310A may communicate with physical and virtual routers using a communication protocol. Virtual routers or switches facilitate overlay networks in one or more virtual networks. In the illustrated example, control plane VM 310A uses Extensible Messaging and Presence Protocol (XMPP) 366A to communicate with at least one virtual router for a virtual network (e.g., virtual routers 14 of FIGS. 1-2). Virtual network route data, statistics collection, logs, and configuration information may in accordance with XMPP 366A be sent as XML documents for communication between control plane VM 310A and the virtual routers. Control plane VM 310A may in turn route data to other XMPP servers (such as an analytics collector) or may retrieve configuration information on behalf of one or more virtual network switches. Control plane VM 310A may further execute a communication interface 340 for communicating with configuration virtual machine (VM) 358A associated with configuration database 360A. Communication interface 340 may represent an IF-MAP interface.

Controller node 302A may further include configuration VM 308A to store configuration information for network elements and to manage configuration database 360A. Configuration VM 308A, although described as a virtual machine, may in some aspects represent a native process executing on an operating system of controller node 302A. Configuration VM 308A and control plane VM 310A may communicate using IF-MAP by communication interface 344A using XMPP. In some aspects, configuration VM 308A may include a horizontally scalable multi-tenant IF-MAP server and a distributed hash table (DHT)-based IF-MAP database that represents configuration database 360A. In some aspects, configuration VM 308A may include a configuration translator, which may translate a user friendly higher-level virtual network configuration to a standards based protocol configuration (e.g., a BGP L3VPN configuration), which may be stored using configuration database 360A. Communication interface 340 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 228 may be flexible for new applications 338.

Controller node 302A may further include an analytics virtual machine (VM) 304A to store diagnostic information (and/or visibility information) related to at least the first set of elements managed by controller node 302A. Control plane VM 310A and analytics VM 304A may communicate using an XMPP implementation by communication interface 346A. Analytics VM 304A, although described as a virtual machine, may in some aspects represent a native process executing on an operating system of controller node 302A.

Analytics VM 304A may include analytics database 356A, which may store visibility data for virtual networks. Visibility information may describe visibility of both distributed SDN controller 300 itself and of customer networks. The distributed database may include an XMPP interface on a first side and a REST/JSON/XMPP interface on a second side.

Virtual routers may be controlled by SDN controller 300 implement the layer 3 forwarding and policy enforcement point for one or more end points and/or one or more hosts. The one or more end points or one and/or one or more hosts may be classified into a virtual network due to configuration from control plane VM 310A. Control plane VM 310A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). A virtual router may be agnostic to actual tunneling encapsulation used. A virtual router may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different controller nodes 302 may be provided by different suppliers. However, the peering configuration of controller nodes 302 may enable use of different hardware and/or software provided by different suppliers for implementing the controller nodes 302 of distributed SDN controller 300. A system operating according to the above may provide logical view of network topology to end-host irrespective of physical network topology, access type, and/or location. Distributed SDN controller 300 provides programmatic ways for network operators and/or applications to change topology, to affect packet forwarding, and/or to add services, as well as horizontal scaling of network services, e.g. firewall, without changing the end-host view of the network.

Any of the virtual network controller operations represented by modules 330 may direct/request controller nodes 302 to establish a service chain for steering traffic, from a BMS and virtual machine across different networks, through a sequence of one or more service nodes 10. UI 334, for instance, may receive a client request to create a service chain (e.g., service chain 26A of FIG. 1) for client traffic. As another example, one of applications 338 may request a service chain for application traffic for the application.

Control plane VMs 310A-310N also include respective service chain units 370A-370N that implement service chains in accordance with techniques described in this disclosure. Operations of service chain units 370A-370N are described hereinafter with respect to service chain unit 370A for ease of description purposes. Service chain unit 370A monitors routes obtained by control plane VMs 310 via XMPP 366A from virtualized elements controlled by SDN controller 300 as well as, in some instances, routes generated by SDN controller 300 for configuring the elements.

In accordance with techniques described herein, service chain unit 370A may establish requested service chains in part by modifying and re-originating routes into networks of elements controlled by SDN controller 300. For example, SDN controller 300 may receive a request (e.g., via UI 334) to configure an inter-network service chain between BMS 328A and a destination endpoint, e.g., VM 315N or BMS 328B, via one or more service nodes, e.g., service nodes implemented by virtual machines 315A-315C ("service node VMs 315").

SDN controller 300 may provision network elements to direct traffic from a source network 322A to a destination network 332N via one or more service node VMs 315. To direct traffic from source network 322A to a destination network 322N via one or more of the service node VMs 315, service chain unit 370A may obtain a route from the destination network 322N, modify the route to set a next-hop and (in some cases) a label to specify a service node at the head-end of the service chain (e.g., service node VM 315A), and re-originate the modified route into the source network 322A. For example, SDN controller 300 may use XMPP 366N to obtain an IP route to a destination endpoint, e.g., VM 315N. In one example, SDN controller 300 may obtain the IP route from a VN agent 313N of server 312N hosting VM 315N. SDN controller 300 may store the IP route in an IP routing table in control plane VM 310A (not shown). Although the examples described herein are described with specific control plane VMs, the techniques can be performed by any of the control plane VMs of SDN controller 300.

To re-originate the obtained IP route into the source network 322A, the service chain unit 370A may use XMPP 366A to send a modified IP route to VN agent 313A of server 312A with a next hop that identifies VM 315A. Service chain unit 370A may further re-originate the obtained IP route as an EVPN route. For example, to direct traffic from a bare metal server 328 to server 312A hosting service node VM 315A, service chain unit 370A may store the IP route obtained from the destination network 322N as an EVPN route in an EVPN routing table of control plane VM 310A for the routing instance (not shown in FIG. 3). For example, service chain unit 370A is configured to originate an EVPN route (e.g., EVPN Type-5 route) in response to an IP route that is originated at the head-end of the service chain (e.g., IP route originated for virtual router 314A). Service chain unit 370A may modify the EVPN route to set a next-hop and (in some cases) a label to specify server 312A that hosts VM 315A that operates as the service node at the head-end of the service chain, and re-originate the EVPN route to TOR switch 316A. To re-originate the EVPN route to the TOR switch 316A, the service chain unit 370A may use BGP 368A to send a BGP message including the EVPN route with a next hop to server 312A that causes TOR switch 316A to steer data traffic originating from BMS 328A and destined for BMS 328B to server 312A. In some examples, the BGP message also includes a route target that causes TOR switch 316A to import the EVPN route.

In some examples, SDN controller 300 may receive a request to configure an inter-network service chain to steer data traffic from virtual machine 315N to BMS 328A via one or more service node VMs 315. In these examples, control plane VM 310A may obtain, e.g., via a BGP session using BGP 368A, an EVPN route specifying an IP address of BMS 328A. Control plane VM 310A may re-originate the obtained EVPN route as an IP route for a routing instance for the destination network, e.g., network 322A. For example, control plane VM 310A may store the EVPN route into an IP routing table of control plane VM 310N for the source network. Service chain unit 370A may modify a next hop that refers to the TOR switch 316A of the destination network 322A. The service chain unit 370A may use XMPP 366A to advertise the IP route to server 312A hosting the virtual router 314A interfacing with service node at the tail-end of the service chain, e.g., service node VM 315C. The virtual router 314A may import the IP route and next hop referring to TOR switch 316A. For example, control plane VM 310A may use XMPP 366A to advertise an XMPP message including the IP route and next hop. In this way, virtual router 314A may use VXLAN encapsulation to send the data traffic received from VM 315C to the TOR switch 316A, which in turn forwards the data traffic to BMS 328A.

In some examples, SDN controller 300 may receive a request to configure an inter-network service chain to steer data traffic between BMS 328A and BMS 328B via one or more of service node VMs 315. In these examples, when control plane VM 310A receives an EVPN route from TOR switch 316B of destination network 322N, control plane VM 310A may re-originate the EVPN route as an IP route for the routing instance. SDN controller 300 may obtain the EVPN route via a communication session with a TOR agent of TOR switch 316B. The TOR agent acts as an OVSDB client for TOR switch 316B and may receive EVPN routes for virtual networks the TOR switch ports are members of and MAC addresses learned in the TOR switches. In some instances, the EVPN routes received by the TOR agent are added to the unicast remote table in OVSDB. In some instances, the MAC addresses received by the TOR agent are exported to appropriate EVPN tables in SDN controller 300 (e.g., control plane VM 310N) and distributed to other controllers, and subsequently to compute nodes and other network devices that support EVPN in the cluster. The controller node 304 subsequently programs a replication tree for each virtual network in the TOR switch and other compute nodes. Control plane VM 310A may store the EVPN route into an IP routing table in control plane VM 310N (not shown) for the routing instance for the destination network 322N. Service chain unit 370A may set a next hop to the TOR switch 316B of the destination network 322N. The service chain unit 370A may use XMPP 366A to advertise the IP route to server 312A hosting the virtual router 314A interfacing with the service node at the tail-end of the service chain, e.g., service node VM 315C. The virtual router 314N may import the IP route and next hop referring to TOR switch 316B. In this way, virtual router 314A may use VXLAN encapsulation to send the data traffic received from VM 315C to the TOR switch 316B, which in turn forwards the data traffic to BMS 328B.

Service chain unit 370A may also set the next hop in the EVPN route obtained from destination network 322N to refer to server 312A hosting the service node at the head-end of the service chain, e.g., service node VM 315A. Service chain unit 370A may use BGP 368A to advertise a routing protocol advertisement (e.g., BGP message) to TOR switch 316A. The BGP message may include the EVPN route and the next hop to configure TOR switch 316A to steer data traffic originating from BMS 328A and destined for BMS 328B to server 312A. In some examples, the BGP message also includes a route target that causes TOR switch 316A to import the EVPN route.

Figure 4:
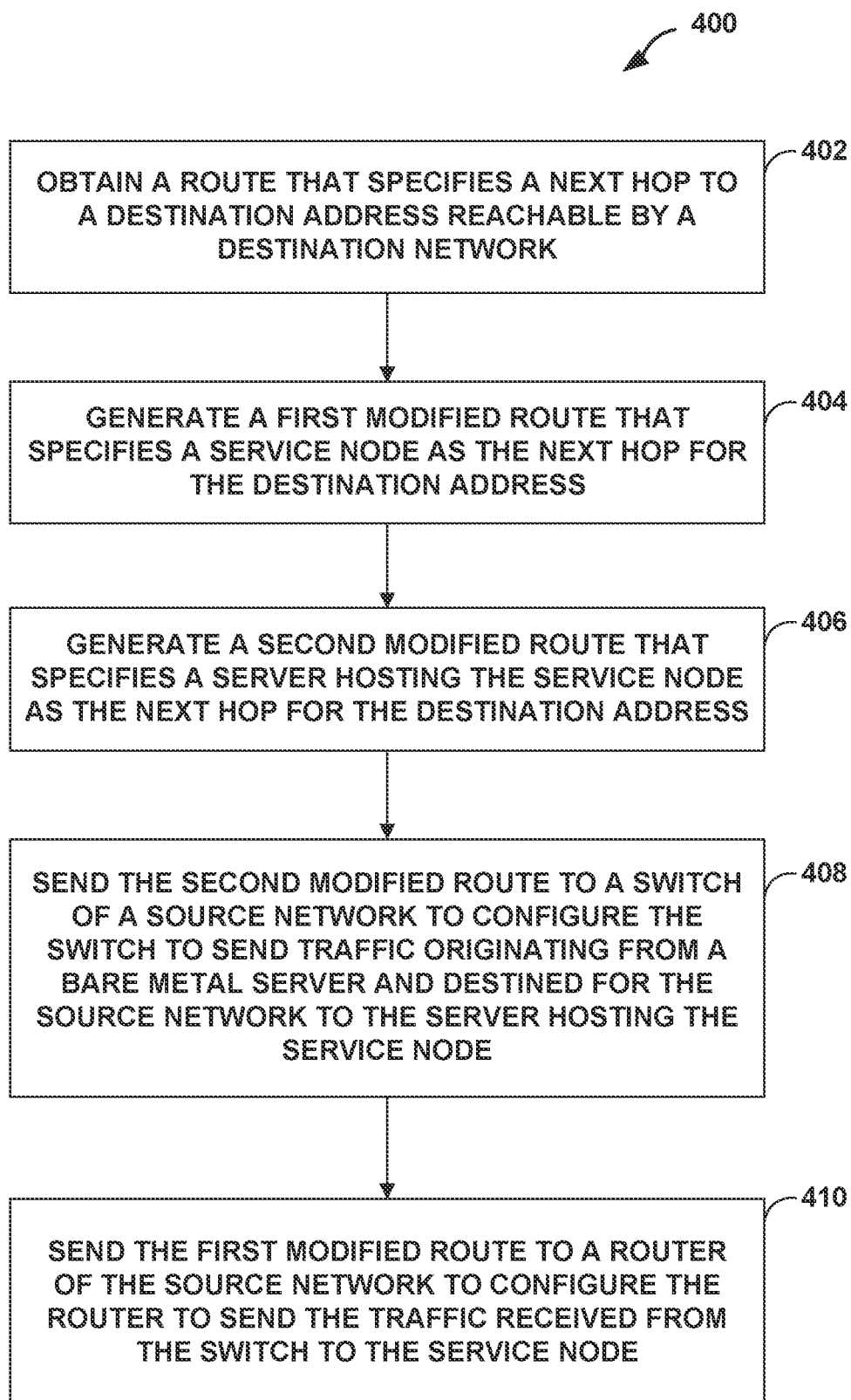
FIG. 4 is a flowchart illustrating an example operation 400 of a controller providing inter-network service chaining, in accordance with one or more aspects of the techniques described in this disclosure.

FIG. 4 is a flowchart illustrating an example operation 400 of a controller providing inter-network service chaining, in accordance with one or more aspects of the techniques described in this disclosure. While described with respect to SDN controller 22 of FIG. 1, example operation 400 may be applied by any controller, server, appliance, management system, or other suitable network device, to perform techniques described herein. Operation 400 of FIG. 4 is described with respect to configuring service chain 26A in network system 2 of FIG. 1 and configuring service chain 33 in network system 2 of FIG. 2. As further described in FIG. 6, SDN controller 22 may perform operation 400 to provide inter-network service chaining from a bare metal server to a virtual execution element (e.g., virtual machine). As further described in FIG. 8, SDN controller 22 may perform operation 400 to provide inter-network service chaining from a bare metal server to a remote bare metal server.

In the example of FIG. 4, SDN controller 22 may obtain, from a destination network 12B, a route that specifies a next hop to a destination address reachable by the destination network (402). In some examples, SDN controller 22 may obtain an IP route from the destination network that specifies a virtual machine (e.g., VM 27 of FIG. 1) that is reachable by the destination network 12B. In such examples, SDN controller 22 may establish a communication session (e.g., communication session 20B) with virtual router 14B of destination network 12B to exchange control state information. SDN controller 22 exchanges IP routes via communication session 20B with virtual router 14B of network 12B, and exchanges IP routes via communication session 20B with virtual router 14B of network 12B. In other examples, SDN controller 22 may obtain an EVPN route from the destination network that specifies a bare metal server (e.g., BMS 31B of FIG. 2) that is reachable by the destination network 12B. In such examples, SDN controller 22 may obtain an EVPN route from communication session 20B with a TOR agent of TOR switch 32B. SDN controller 22 may obtain an EVPN route, such as an EVPN Type-5 route specifying an IP address of BMS 31B.

SDN controller 22 may generate a first modified route that specifies a service node as the next hop for the destination address, wherein the service node is external to the destination network (404). In one example, if SDN controller 22 obtains an IP route from the destination network, SDN controller 22 may modify the IP route by modifying the next hop to a service node 10A operating as the head end of the service chain. For example, SDN controller 22 modifies the obtained IP route to direct traffic to one or more of service nodes 10 rather than directly to destination network 12B. In other examples, if SDN controller 22 obtains an EVPN route from the destination network, SDN controller may re-originate the EVPN route as an IP route and modify the next hop to the service node 10A operating as the head end of the service chain.

SDN controller 22 may generate a second modified route that specifies a server hosting the service node as the next hop for the destination address (406). In one example, if SDN controller 22 obtains an IP route from the destination network, SDN controller 22 may store the IP route obtained from destination network 12B as an EVPN route (e.g., EVPN Type-5 route). SDN controller may set the next hop for the EVPN route as an IP address for the physical server that hosts the service node (e.g., as a virtual machine). In other examples, if SDN controller 22 obtains an EVPN route from the destination network, SDN controller 22 may set the next hop in the EVPN route to refer to a server hosting the service node at the head-end of the service chain. Modifying the next hop in the EVPN route may include modifying a destination network address for an underlying physical network to point to a network address of a server that hosts the "left" interface of service node 10A.

SDN controller 22 may send the second modified route to a switch of a source network to configure the switch to send traffic originating from a bare metal server and destined for the source network to the server hosting the service node (408). For example, SDN controller 22 may send the EVPN route to TOR switch 16 with a next hop set to the server hosting the "left" interface of service node 10A and a route target to cause TOR switch 16 to import the route target. In this way, TOR switch 16 may import the EVPN route with the destination address of a destination node (e.g., VM 27 of FIG. 1 or BMS 31B of FIG. 2) and the next hop set to the server that hosts the "left" interface of service node 10A. TOR switch 16 may store the EVPN route in an EVPN routing table and configure a next hop in its forwarding table to the server that hosts the "left" interface of service node 10A.

SDN controller 22 may send the first modified route to a router of the source network to configure the router to send the traffic received from the switch to the service node (408). For example, SDN controller 22 may advertise the modified IP route in a routing protocol message to source network 12A, the modified IP route having a next hop set to the "left" interface of service node 10A. Virtual router 14A of source network 12A imports the modified IP route that was advertised, which causes the virtual router 14A to steer data traffic from source network 12A to service node 10A rather than directly to destination network 12B. For example, when virtual router 14A receives network traffic destined for a destination node (e.g., VM 27 of FIG. 1 or BMS 31B of FIG. 2), virtual router 14A may steer the network traffic to the route next hop, i.e., service node 10A.

Figure 5:
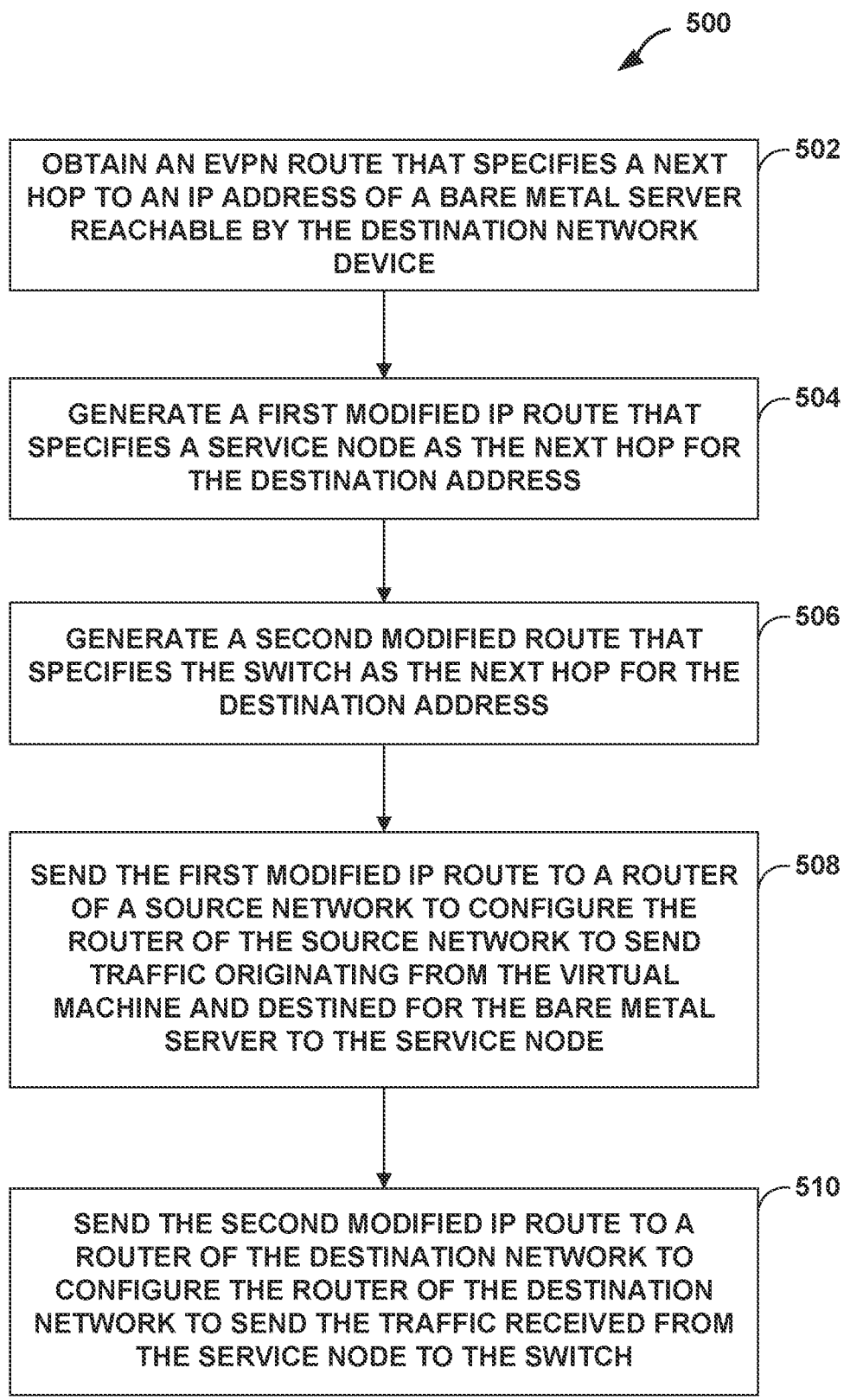
FIG. 5 is a flowchart illustrating another example operation 500 of a controller providing inter-network service chaining, in accordance with one or more aspects of the techniques described in this disclosure.

FIG. 5 is a flowchart illustrating another example operation 500 of a controller providing inter-network service chaining, in accordance with one or more aspects of the techniques described in this disclosure. While described with respect to SDN controller 22 of FIG. 1, example operation 500 may be applied by any controller, server, appliance, management system, or other suitable network device, to perform techniques described herein. Operation 500 of FIG. 5 is described with respect to configuring service chain 26B in network system 2 of FIG. 1. As further described in FIG. 7, SDN controller 22 may perform operation 500 to provide inter-network service chaining from a virtual execution element (e.g., virtual machine) to a bare metal server.

SDN controller 22 may obtain, from a switch in a destination network, an Ethernet Virtual Private Network (EVPN) route that specifies a next hop to an Internet Protocol (IP) address of a bare metal server reachable by the destination network (502). For example, SDN controller 22 may obtain the EVPN route via communication session 20A with a TOR agent of TOR switch 16. The EVPN route may include an EVPN Type-5 route that specifies an IP address of BMS 28 associated with destination network 12A.

SDN controller 22 may generate a first modified IP route that specifies a service node as a next hop for the destination address (504). For example, SDN controller 22 may re-originate the obtained EVPN route as an IP route. For example, in addition to storing the EVPN route in the EVPN routing table 24, SDN controller 22 may also store the EVPN route as an IP route in an IP routing table for the routing instance. SDN controller 22 may set the next hop in the IP route to refer to a server hosting the service node at the head-end of the service chain.

SDN controller 22 may generate a second modified IP route that specifies the switch as the next hop for the destination address, wherein the switch is directly connected to the bare metal server (506). For example, SDN controller 22 may re-originate the obtained EVPN route as an IP route. For example, in addition to storing the EVPN route in the EVPN routing table 24, SDN controller 22 may also store the EVPN route as an IP route in an IP routing table for the routing instance. SDN controller 22 may set the next hop in the IP route to TOR switch 16.

SDN controller 22 may send the first modified IP route to a router of a source network to configure the router of the source network to send traffic originating from the virtual machine and destined for the bare metal server to the service node (508). For example, SDN controller 22 may advertise a routing protocol message including the EVPN route obtained from the destination network, e.g., destination network 12A, to the source network 12B associated with the server hosting the service node at the head-end of the service chain, e.g., service node 10C. Virtual router 14B of the source network 12B may import the EVPN route in an EVPN routing table for the source network 12B and may also store the IP route specified in the EVPN route in an IP routing table. In this way, when virtual router 14B receives data traffic originating from VM 27 and destined for BMS 28, virtual router 14B performs a lookup of its forwarding table and determines that the next hop is the head-end of the service chain (e.g., service node 10C in this example).

SDN controller 22 may send the second modified IP route to a router of the destination network to configure the router of the destination network to send the traffic received from the service node to the switch (510). For example, SDN controller 22 may advertise the IP route to the destination network, e.g., destination network 12A. The virtual router 14A may import the IP route and next hop referring to TOR switch 16 such that virtual router 14A is configured to steer data traffic received from a service node at the tail end of the service chain (e.g., service node 10A) to TOR switch 16. In this way, when virtual router 14A receives data traffic from the tail-end of the service chain, virtual router 14A may perform a lookup of its forwarding table and determines that the next hop is TOR switch 16 and sends the traffic to TOR switch 16.

Figure 6:
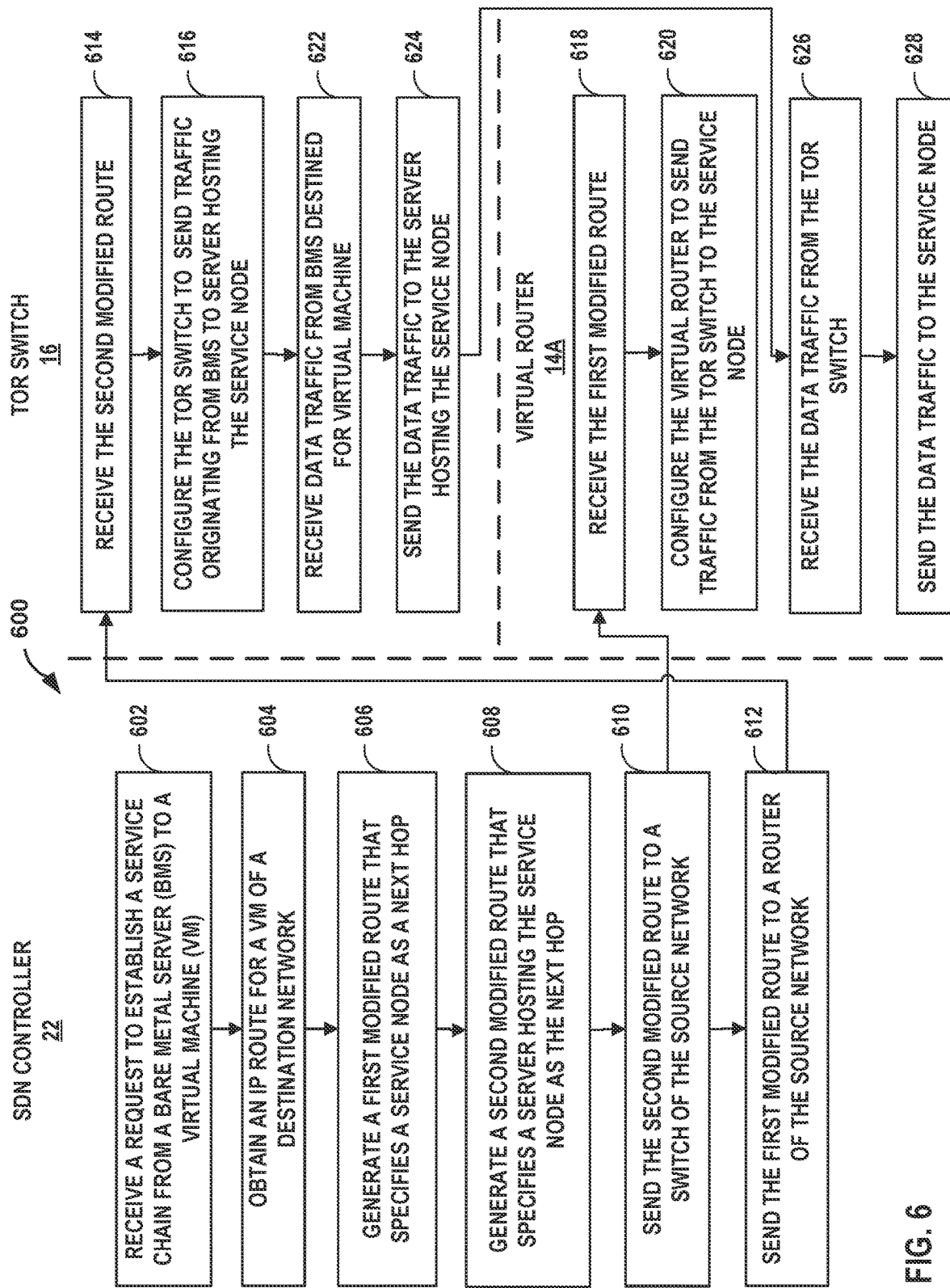
FIG. 6 is a flowchart illustrating an example operation of a network system providing an inter-network service chain from a bare metal server to a virtual execution element, in accordance with one or more aspects of the techniques described in this disclosure.

FIG. 6 is a flowchart illustrating an example operation 600 of a network system providing an inter-network service chain from a bare metal server to a virtual execution element (e.g., virtual machine), in accordance with one or more aspects of the techniques described in this disclosure. While described with respect to SDN controller 22 of FIG. 1, example operation 600 may be applied by any controller, server, appliance, management system, or other suitable network device, to perform techniques described herein. Operation 600 of FIG. 6 is described with respect to network system 2 of FIG. 1.

SDN controller 22 receives a request that defines a service chain (e.g., service chain 26A of FIG. 1) for steering traffic from a bare metal server to a virtual machine across different networks via one or more service nodes (602). SDN controller 22 may obtain (e.g., store, generate, or receive) an IP route for the destination network 12B that specifies a next hop for a destination endpoint, e.g., VM 27, of the destination network (604). SDN controller 22 generates a first modified route that specifies a service node as a next hop for the destination address (606). For example, SDN controller 22 may set the next hop for the IP route as an IP address for a service node that provides the service and, in some instances, setting a label that identifies a routing instance associated with the service node to a router. SDN controller 22 generate a second modified route that specifies a server hosting the service node as the next hop for the destination address (608). For example, SDN controller 22 may store the IP route obtained from destination network 12B as an EVPN route (e.g., EVPN Type-5 route). SDN controller may set the next hop for the EVPN route as an IP address for the physical server that hosts the service node (e.g., as a virtual machine).

SDN controller 22 may send the second modified route (e.g., EVPN route) to TOR switch 16 to configure TOR switch 16 to send traffic originating from BMS 28 to the server hosting the service node 10A (610). In some examples, TOR switch 16 may be configured with an appropriate route target to import the EVPN route from SDN controller 22. SDN controller 22 may also send the first modified route to virtual router 14A of the source network 12A to configure virtual router 14A to send traffic received from TOR switch 16 to the service node 10A (612).

TOR switch 16 may receive the second modified route (614) and configure the TOR switch to send traffic originating from BMS 28 to the server hosting the service node 10A (616). For example, the TOR switch 16 may receive the EVPN route with the appropriate target route and may import the EVPN route with the IP address of VM 27 and the next hop set to the server that hosts the virtual machine that implements service node 10A. TOR switch 16 may store the next hop in its forwarding information to steer traffic originating from BMS 28 to the server hosting the service node 10A. Virtual router 14A may receive the first modified route (618) and configure the virtual router to send traffic received from BMS 28 to service node 10A (620). For example, virtual router 14A imports the route with the destination address for VM 27 and the next hop set to the service node 10A.

Having imported the routes advertised by SDN controller 22, TOR switch 16 and virtual router 14A may steer traffic along service chain 26A from the BMS 28 to VM 27 via service nodes 10. For example, TOR switch 16 may receive data traffic from BMS 28 that is destined for the virtual machine 27 (622). TOR switch 16 may perform a lookup of its EVPN routing table and determine the next hop set to the server that hosts the virtual machine that implements the service node 10A. TOR switch 16 may send the data traffic to the server hosting the service node 10A (624) by encapsulating the data traffic with a VXLAN header having a virtual network identifier (VNI) identifying the routing instance for the destination network. When virtual router 14A receives the data traffic from the TOR switch 16 (626), virtual router 14A may de-encapsulate the VXLAN header and performs a lookup of the next hop based on the VNI. The virtual router 14A may determine from the lookup that the next hop is the service node 10A and sends the packet to the virtual machine operating as service node 10A (628). In some examples, virtual router 14A may send the traffic to service node 10A using, for example, MPLSoGRE/UDP encapsulation.

After applying one or more services to the traffic flow, the service node at the tail-end of the service chain, e.g., service node 10C, may send the traffic to the "right" interface of service node 10C toward destination network 12B. Virtual router 14B may receive the data traffic and sends the data traffic to VM 27.

FIG. 7 is a flowchart illustrating an example operation 700 of a network system providing an inter-network service chain from a virtual execution element (e.g., virtual machine) to a bare metal server, in accordance with one or more aspects of the techniques described in this disclosure. While described with respect to SDN controller 22 of FIG. 1, example operation 700 may be applied by any controller, server, appliance, management system, or other suitable network device, to perform techniques described herein. Operation 700 of FIG. 7 is described with respect to network system 2 of FIG. 1.

SDN controller 22 receives a request that defines a service chain (e.g., service chain 26B of FIG. 1) for steering traffic from a virtual machine to a bare metal server across different networks via one or more service nodes (702). SDN controller 22 may obtain (e.g., store, generate, or receive) an EVPN route (e.g., EVPN Type-5 route) for a destination network 12A that specifies a next hop for a destination endpoint, e.g., BMS 28, of the destination network (704). SDN controller 22 generates a first modified route that specifies a service node as a next hop for the destination address (706). For example, SDN controller 22 may store the EVPN route obtained from destination network 12B as an IP route using the IP address of BMS 28 specified by the EVPN route. SDN controller 22 may generate a second modified route that specifies a switch of the destination network 12B as the next hop for the destination address (708).

SDN controller 22 may send the first modified route (e.g., IP route) to virtual router 14B to configure virtual router 14B to send traffic originating from VM 27 to the service node at the head-end of the service chain (e.g., service node 10C) (710). SDN controller 22 may also send the second modified route to virtual router 14A of the destination network 12A to configure virtual router 14A to send traffic received from a service node tail-end of the service chain (e.g., service node 10A) to the TOR switch 16 (712).

Virtual router 14B of source network 12B may receive the first modified route (714) and configure the virtual router to send traffic originating from VM 27 to the service node at the head-end of the service chain (716). For example, the virtual router 14B may receive the IP route and may import the IP route with the IP address of BMS 28 and the next hop set to the virtual machine that implements the head-end of the service chain, e.g., service node 10C. Virtual router 14A of destination network 12A may receive the second modified route (718) and configure the virtual router to send traffic received from the service node tail-end of the service chain to TOR switch 16 (720). For example, virtual router 14A imports the route with the destination address for BMS 28 and the next hop set to the TOR switch 16.

Having imported the routes advertised by SDN controller 22, virtual routers 14A and 14B may steer traffic along service chain 26B from VM 27 to BMS 28 via service nodes 10. For example, virtual router 14B may receive data traffic from VM 27 that is destined for the BMS 28 (722). Virtual router 14B may perform a lookup of its forwarding table and determine the next hop set to the virtual machine that implements the head-end of the service chain, e.g., service node 10C. Virtual router 14B may send the data traffic to service node 10C (724) using, for example, MPLSoGRE/UDP encapsulation. After applying one or more services to the traffic flow, the service node at the tail-end of the service chain, e.g., service node 10A, may send the traffic toward destination network 12A. When virtual router 14A receives the data traffic from the service node at the tail-end of the service chain (e.g., service node 10A) (726), virtual router 14A may de-encapsulate the MPLSoGRE/UDP header and performs a lookup of the next hop based on the MPLS label. The virtual router 14A may determine from the lookup that the next hop is TOR switch 16 and sends the packet to the TOR switch 16 that ultimately sends the data traffic to BMS 28 (728). In some examples, virtual router 14A may send the traffic to TOR switch 16 using, for example, VXLAN encapsulation.

FIG. 8 is a flowchart illustrating another example operation 800 of a network system providing an inter-network service chain from a bare metal server to a remote bare metal server, in accordance with one or more aspects of the techniques described in this disclosure. While described with respect to SDN controller 22 of FIG. 2, example operation 800 may be applied by any controller, server, appliance, management system, or other suitable network device, to perform techniques described herein. Operation 800 of FIG. 8 is described with respect to network system 2 of FIG. 2.

SDN controller 22 receives a request that defines a service chain (e.g., service chain 33 of FIG. 2) for steering traffic from a bare metal server to a virtual machine across different networks via one or more service nodes (802). SDN controller 22 may obtain (e.g., store, generate, or receive) an EVPN route for a destination network 12B that specifies a next hop for a destination endpoint, e.g., BMS 31B, of the destination network (804). For example, SDN controller 22 may store the EVPN route obtained from destination network 12B as an IP route using the IP address of BMS 31B specified by the EVPN route. SDN controller 22 may generate a second modified route that specifies a service node as a next hop for the destination address (808). For example, SDN controller 22 may set the next hop for the IP route as an IP address for a service node that provides the service and, in some instances, setting a label that identifies a routing instance associated with the service node to a router. SDN controller 22 generate a second modified route that specifies a server hosting the service node as the next hop for the destination address. SDN controller 22 may generate a third modified route that specifies a switch of the destination network 12B as the next hop for the destination address (810). SDN controller 22 may send the first modified route to virtual router 14A of the source network 12A to configure virtual router 14A to send traffic received from a TOR switch 32A to the service node at the head-end of the service chain (812). SDN controller 22 may also send the second modified route to TOR switch 32A of the source network 12A to configure the TOR switch to send traffic originating from BMS 31A to a server hosting the service node at the head-end of the service chain (814). SDN controller 22 may further send the third modified route to virtual router 14B of the destination network 12B to configure virtual router 14B to send traffic received from a service node at the tail-end of the service chain (e.g., service node 10A) to the TOR switch 32B (816).

TOR switch 32A may receive the second modified route and configure virtual router 14A to send traffic received from a TOR switch 32A to the service node at the head-end of the service chain (818). For example, the TOR switch 32A may receive the EVPN route with the appropriate target route and may import the EVPN route with the IP address of BMS 31B and the next hop set to the server that hosts the virtual machine that implements service node 10A. Virtual router 14A may receive the first modified route and configure the TOR switch to send traffic originating from BMS 31A to a server hosting the service node at the head-end of the service chain (820). For example, virtual router 14A imports the route with the destination address for BMS 31B and the next hop set to the service node 10A. Virtual router 14B of destination network 12B may receive the second modified route configure virtual router 14B to send traffic received from a service node at the tail-end of the service chain (e.g., service node 10A) to the TOR switch 32B (822). For example, virtual router 14B imports the route with the destination address for BMS 31B and the next hop set to the TOR switch 32B.

Having imported the routes advertised by SDN controller 22, virtual routers 14 and TOR switches 32 may steer traffic along service chain 33 from the BMS 31A to BMS 31B via service nodes 10. For example, TOR switch 32A may receive data traffic from BMS 31A that is destined for BMS 31B (824). TOR switch 32A may perform a lookup of its EVPN routing table and determine the next hop set to the server that hosts the virtual machine that implements the service node 10A. TOR switch 32A may send the data traffic to the server hosting the service node 10A (826) by encapsulating the data traffic with a VXLAN header having a virtual network identifier (VNI) identifying the routing instance for the destination network. When virtual router 14A receives the data traffic from the TOR switch 32A (828), virtual router 14A may de-encapsulate the VXLAN header and performs a lookup of the next hop based on the VNI. The virtual router 14A may determine from the lookup that the next hop is the service node 10A and sends the packet to the virtual machine operating as service node 10A (830). In some examples, virtual router 14A may send the traffic to service node 10A using, for example, MPLSoGRE/UDP encapsulation. After applying one or more services to the traffic flow, the service node at the tail-end of the service chain, e.g., service node 10C, may send the traffic toward destination network 12B. When virtual router 14B receives the data traffic from the service node at the tail-end of the service chain (e.g., service node 10C) (832), virtual router 14B may de-encapsulate the MPLSoGRE/UDP header and performs a lookup of the next hop based on the MPLS label. The virtual router 14B may determine from the lookup that the next hop is TOR switch 32B and sends the packet to the TOR switch 32B (834) that ultimately sends the data traffic to BMS 31B. In some examples, virtual router 14B may send the traffic to TOR switch 32B using, for example, VXLAN encapsulation.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
generating, by a controller and based on a route received from a destination network that specifies a next hop to a destination address of a destination endpoint reachable by the destination network, a first modified route that specifies a service node as the next hop for the destination address;
generating, by the controller and based on the route, a second modified route that specifies a server hosting the service node as the next hop for the destination address;
sending, by the controller, the second modified route to a first network device of a source network to cause the first network device of the source network to send traffic originating from a source endpoint to the server hosting the service node; and
sending, by the controller, the first modified route to a second network device of the source network to cause the second network device of the source network to send the traffic received from the server to the service node.

2. The method of claim 1,
wherein the destination endpoint comprises a virtual execution element,
wherein the source endpoint comprises a bare metal server,
wherein the route received from the destination network comprises an Internet Protocol (IP) route that specifies an IP address of the virtual execution element,
wherein generating the first modified route comprises modifying the next hop of the IP route to include the service node, and
wherein generating the second modified route comprises re-originating the IP route as an Ethernet Virtual Private Network (EVPN) route in an EVPN routing table, wherein a next hop specified by the EVPN route includes the server hosting the service node.

3. The method of claim 2,
wherein the first network device of the source network comprises a physical network device directly connected to the source endpoint,
wherein sending the second modified route to the first network device of the source network comprises establishing a border gateway protocol (BGP) session with the physical network device to send a BGP message including the EVPN route to the physical network device,
wherein the second network device of the source network comprises a virtual network device executed on the server,
wherein sending the first modified route to the second network device of the source network comprises establishing an Extensible Messaging and Presence Protocol (XMPP) session to send an XMPP message including the IP route to the virtual network device.

4. The method of claim 3,
wherein the BGP message further includes a route target generated by the physical network device to cause the second network device to import the EVPN route.

5. The method of claim 1,
wherein the source endpoint comprises a source bare metal server,
wherein the destination endpoint comprises a destination bare metal server,
wherein the route received from the destination network comprises an Ethernet Virtual Private Network (EVPN) route that specifies an Internet Protocol (IP) address of the destination bare metal server,
wherein generating the first modified route comprises modifying the next hop for the destination address in the EVPN route to specify the server hosting the service node, and
wherein generating the second modified route comprises modifying the next hop for the destination address in the EVPN route to specify the service node.

6. The method of claim 5, further comprising:
generating, by the controller, a third modified route, wherein generating the third modified route comprises re-originating the EVPN route as an IP route in an IP routing table,
wherein a next hop of the IP route includes the IP address of a physical network device of the destination network,
wherein the network device of the destination network is directly connected to the destination bare metal server; and
sending, by the controller, the third modified route to a virtual network device of the destination network to cause the virtual network device of the destination network to send traffic received from the server hosting the service node to the physical network device of the destination network.

7. The method of claim 1,
wherein the first network device of the source network is configured to send the traffic originating from the source endpoint to the server using a Virtual Extensible Local Area Network (VXLAN), and
wherein the second network device of the source network is configured to send the traffic received from the server to the service node using Multiprotocol Label Switching (MPLS) over Generic Route Encapsulation (GRE) or MPLS over User Datagram Protocol (UDP).

8. A system comprising:
a source endpoint of a source network;
a destination endpoint of a destination network;
a server hosting a plurality of service nodes; and
a controller comprising one or more processors configured to:
generate, based on a route received from the destination network that specifies a next hop to a destination address of the destination endpoint reachable by the destination network, a first modified route that specifies a service node of the plurality of service nodes as the next hop for the destination address;

generate, based on the route, a second modified route that specifies the server hosting the service node as the next hop for the destination address;

send the second modified route to a first network device of the source network to cause the first network device of the source network to send traffic originating from the source endpoint to the server hosting the service node; and send the first modified route to a second network device of the source network to cause the second network device of the source network to send traffic received from the server to the service node.

9. The system of claim 8, wherein the destination endpoint comprises a virtual execution element, wherein the source endpoint comprises a bare metal server, wherein the route received from the destination network comprises an Internet Protocol (IP) route that specifies an IP address of the virtual execution element, wherein to generate the first modified route, the one or more processors are configured to modify the next hop of the IP route to include the service node, and wherein to generate the second modified route, the one or more processors are configured to re-originate the IP route as an Ethernet Virtual Private Network (EVPN) route in an EVPN routing table, wherein a next hop specified by the EVPN route includes the server hosting the service node.

10. The system of claim 8, wherein the first network device of the source network comprises a physical network device directly connected to the source endpoint, wherein to send the second modified route to the first network device of the source network, the one or more processors are configured to establish a border gateway protocol (BGP) session with the physical network device to send a BGP message including an Ethernet Virtual Private Network (EVPN) route to the physical network device, wherein the second network device of the source network comprises a virtual network device executed on the server, and wherein to send the first modified route to the second network device of the source network, the one or more processors are configured to establish an Extensible Messaging and Presence Protocol (XMPP) session to send an XMPP message including the IP route to the virtual network device.

11. The system of claim 10, wherein the BGP message further includes a route target generated by the physical network device to enable the second network device to import the EVPN route.

12. The system of claim 8, wherein the source endpoint comprises a source bare metal server, wherein the destination endpoint comprises a destination bare metal server, wherein the route received from the destination network comprises an Ethernet Virtual Private Network (EVPN) route that specifies an Internet Protocol (IP) address of the destination bare metal server, wherein to generate the first modified route, the one or more processors are configured to modify the next hop for the destination address in the EVPN route to specify the server hosting the service node, and wherein to generate the second modified route, the one or more processors are configured to modify the next hop for the destination address in the EVPN route to specify the service node.

13. The system of claim 12, wherein the one or more processors are further configured to:

generate a third modified route, wherein generating the third modified route comprises re-originating the EVPN route as an IP route in an IP routing table, wherein a next hop of the IP route includes the IP address of a physical network device of the destination network, wherein the network device of the destination network is directly connected to the destination bare metal server; and send the third modified route to a virtual network device of the destination network to cause the virtual network device of the destination network to send traffic received from the server hosting the service node to the physical network device of the destination network.

14. The system of claim 8, wherein the physical network device of the source network is configured to send the traffic originating from the source endpoint to the server using a Virtual Extensible Local Area Network (VXLAN), and wherein the second network device of the source network is configured to send the traffic received from the server to the service node using Multiprotocol Label Switching (MPLS) over Generic Route Encapsulation (GRE) or MPLS over User Datagram Protocol (UDP).

15. A non-transitory computer-readable storage medium having stored thereon instructions that, when executed, cause one or more processors of a controller to:

generate, based on a route received from a destination network that specifies a next hop to a destination address of a destination endpoint reachable by the destination network, a first modified route that specifies a service node as the next hop for the destination address;

generate, based on the route, a second modified route that specifies a server hosting the service node as the next hop for the destination address;

send the second modified route to a first network device of a source network to cause the first network device of the source network to send traffic originating from a source endpoint to the server hosting the service node; and send the first modified route to a second network device of the source network to cause the second network device of the source network to send the traffic received from the server to the service node.

16. The non-transitory computer-readable storage medium of claim 15, wherein the destination endpoint comprises a virtual execution element, wherein the source endpoint comprises a bare metal server, wherein the route received from the destination network comprises an Internet Protocol (IP) route that specifies an IP address of the virtual execution element, wherein to generate the first modified route, the instructions further cause one or more processors of the controller to modify the next hop of the IP route to include the service node, and wherein to generate the second modified route, the instructions further cause one or more processors of the controller to re-originate the IP route as an Ethernet Virtual Private Network (EVPN) route in an EVPN routing table, wherein a next hop specified by the EVPN route includes the server hosting the service node.

17. The non-transitory computer-readable storage medium of claim 16,
wherein the first network device of the source network comprises a physical network device directly connected to the source endpoint,
wherein to send the second modified route to the first network device of the source network, the instructions further cause one or more processors of the controller to establish a border gateway protocol (BGP) session with the physical network device to send a BGP message including the EVPN route to the physical network device,
wherein the second network device of the source network comprises a virtual network device executed on the server,
wherein to send the first modified route to the second network device of the source network, the instructions further cause one or more processors of the controller to establish an Extensible Messaging and Presence Protocol (XMPP) session to send an XMPP message including the IP route to the virtual network device.

18. The non-transitory computer-readable storage medium of claim 17,
wherein the BGP message further includes a route target generated by the physical network device to cause the second network device to import the EVPN route.

19. The non-transitory computer-readable storage medium of claim 15,
wherein the source endpoint comprises a source bare metal server,
wherein the destination endpoint comprises a destination bare metal server,
wherein the route received from the destination network comprises an Ethernet Virtual Private Network (EVPN) route that specifies an Internet Protocol (IP) address of the destination bare metal server,
wherein to generate the first modified route, the instructions further cause one or more processors of the controller to modify the next hop for the destination address in the EVPN route to specify the server hosting the service node, and wherein to generate the second modified route, the instructions further cause one or more processors of the controller to modify the next hop for the destination address in the EVPN route to specify the service node.

20. The non-transitory computer-readable storage medium of claim 15, wherein the instructions further cause one or more processors of the controller to:
generate a third modified route, wherein to generate the third modified route comprises re-originating an Ethernet Virtual Private Network (EVPN) route as an IP route in an IP routing table,
wherein a next hop of the IP route includes the IP address of a physical network device of the destination network,
wherein the network device of the destination network is directly connected to the destination bare metal server; and
send the third modified route to a virtual network device of the destination network to cause the virtual network device of the destination network to send traffic received from the server hosting the service node to the physical network device of the destination network.

21. A system comprising:
a memory; and
one or more processors coupled to the memory and configured to:
generate, based on a route received from a destination network that specifies a next hop to a destination address of a destination endpoint reachable by the destination network, a first modified route that specifies a service node as the next hop for the destination address;
generate, based on the route, a second modified route that specifies a server hosting the service node as the next hop for the destination address;
send the second modified route to a first network device of a source network to cause the first network device of the source network to send traffic originating from a source endpoint to the server hosting the service node; and
send the first modified route to a second network device of the source network to cause the second network device of the source network to send the traffic received from the server to the service node.

* * * * *